United States Patent

Tanaka et al.

[11] Patent Number: 5,988,821
[45] Date of Patent: Nov. 23, 1999

[54] LENS TYPE FUNCTIONAL RETROREFLECTIVE SHEETING AND METHOD OF PRODUCING SAME

[75] Inventors: Osamu Tanaka; Kiyohito Hiromitsu; Kunihiro Takao, all of Sano; Katsura Ochi, Kazo, all of Japan

[73] Assignee: Nippon Carbide Kogyo Kabushiki Kaisha, Tokyo, Japan

[21] Appl. No.: 09/000,052

[22] PCT Filed: May 16, 1997

[86] PCT No.: PCT/JP97/01649

§ 371 Date: Jan. 16, 1998

§ 102(e) Date: Jan. 16, 1998

[87] PCT Pub. No.: WO97/43670

PCT Pub. Date: Nov. 20, 1997

[30] Foreign Application Priority Data

May 16, 1996 [JP] Japan ................................. 8-144834
Oct. 21, 1996 [JP] Japan ................................. 8-297028

[51] Int. Cl.⁶ .................................................. G02B 5/128
[52] U.S. Cl. .......................... 359/536; 359/538; 359/539; 359/540; 359/541; 359/900
[58] Field of Search ..................................... 359/534, 542, 359/513, 900; 427/163.4; 428/178, 195, 201–204, 207, 913

[56] References Cited

U.S. PATENT DOCUMENTS

| 4,075,049 | 2/1978 | Wood. |
| 4,897,136 | 1/1990 | Bailey et al.. |
| 5,601,911 | 2/1997 | Ochi et al. ............................ 428/304.4 |
| 5,683,746 | 11/1997 | Hedblom et al. ..................... 427/163.4 |
| 5,759,671 | 6/1998 | Tanaka et al.. |

FOREIGN PATENT DOCUMENTS

| 52-64897 | 5/1977 | Japan. |
| 62-121043 | 6/1987 | Japan. |
| 5173008 | 7/1993 | Japan. |
| 6160615 | 6/1994 | Japan. |
| 9314422 | 7/1993 | WIPO. |
| 9618920 | 6/1996 | WIPO. |

*Primary Examiner*—James Phan
*Attorney, Agent, or Firm*—Sherman and Shalloway

[57] ABSTRACT

This invention relates to lens type functional retroreflective sheeting having retroreflective regions and visual functionality presenting regions, the retroreflective sheeting comprising:

a base sheet consisting of a support comprising a functional resin layer containing a functional pigment having light-storing or fluorescent properties, microspherical lens-embedding regions in which microspherical lenses are densely distributed on the surface of the functional resin layer of the support so as to form a mono-layer, and microspherical lens-free regions in which substantially no microspherical lens is embedded and the functional resin layer is exposed;

a transparent protective film disposed above the microspherical lens-bearing surface of the base sheet; and bonds at which said base sheet and said transparent protective film are partly bonded together. This lens type functional retroreflective sheeting not only afford good visibility to viewers positioned in the direction of the light source (e.g., automobile drivers), but also afford good visibility at night to drivers and pedestrians positioned in directions different from the that of the light source.

30 Claims, 6 Drawing Sheets

F I G. 3
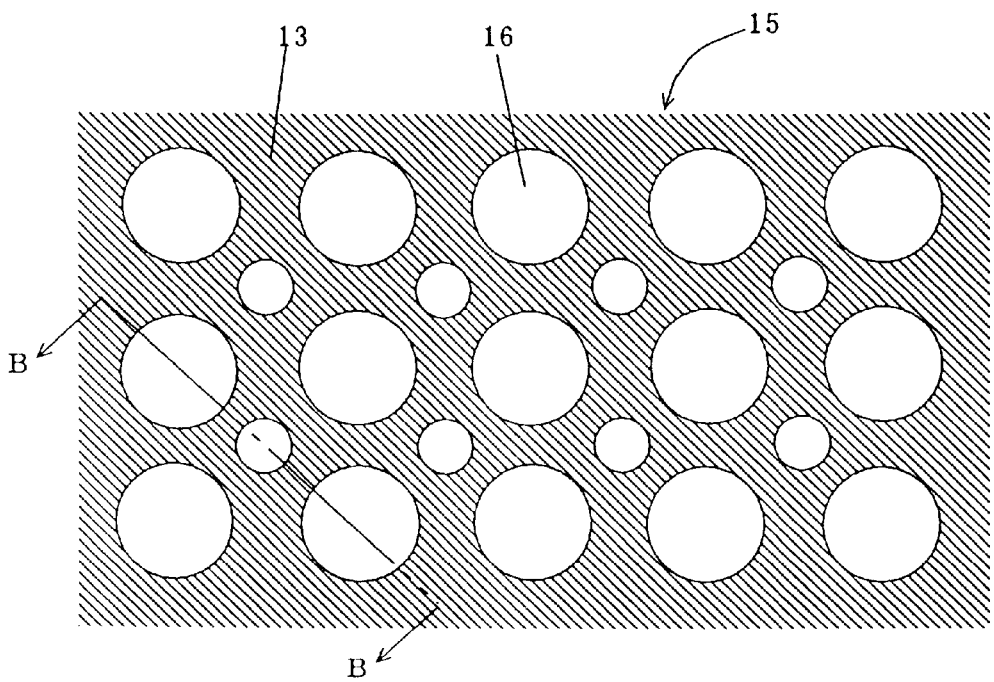
F I G. 4
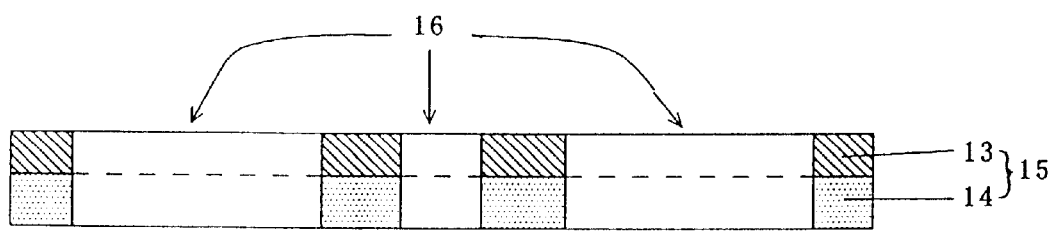

F I G. 9
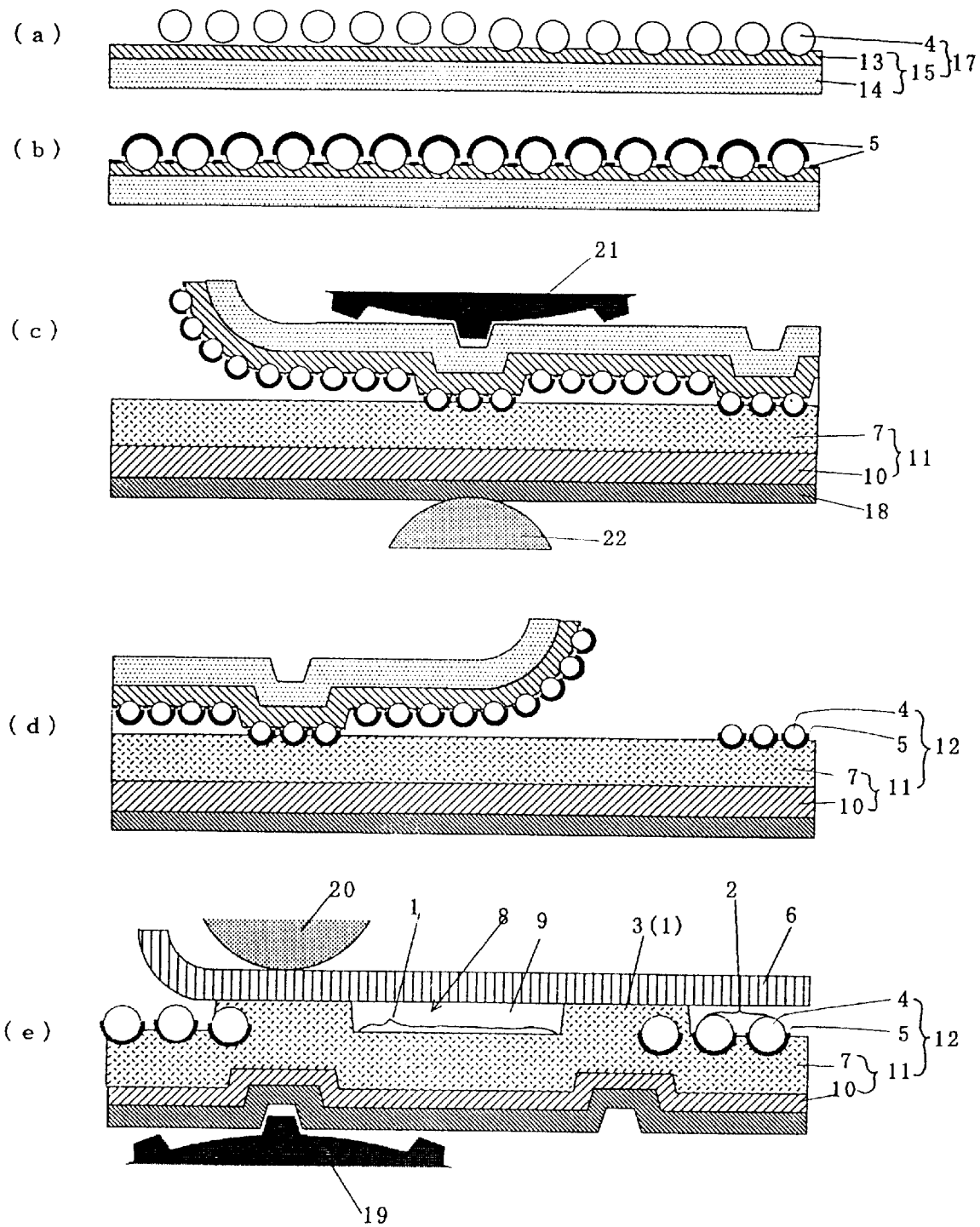

LENS TYPE FUNCTIONAL RETROREFLECTIVE SHEETING AND METHOD OF PRODUCING SAME

TECHNICAL FIELD

This invention relates to lens type functional retroreflective sheeting which is useful in signs such as road signs, guide signs and construction signs, license plates for vehicles such as automobiles and motorcycles, safety goods such as safety clothing, safety shoes and life-saving devices, signboards, markings for vehicles, and the like.

More particularly, it relates to lens type functional retroreflective sheeting having retroreflective regions and visual functionality presenting regions, the retroreflective sheeting comprising:

a base sheet consisting of a support comprising, as an essential component, a functional resin layer containing a functional pigment having light-storing or fluorescent properties, microspherical lens-embedding regions in which microspherical lenses are densely distributed on the surface of the functional resin layer of the support so as to form a mono-layer, and microspherical lens-free regions in which essentially no microspherical lens is embedded and the functional resin layer is exposed;

a transparent protective film disposed above the microspherical lens-bearing surface of the base sheet; and bonds at which said base sheet and said transparent protective film are partly bonded together.

BACKGROUND ART

Conventionally, retroreflective sheeting capable of reflecting incident light back toward the light source has been well known, and such sheeting is widely used in the above-described fields of application owing to good visibility at night on the basis of its retroreflectivity. For example, road signs, construction signs and other signs using retroreflective sheeting have excellent characteristics in that, at night or the like, they reflect light from a light source (e.g., the headlamps of a moving vehicle such as automobile) back toward the light source (i.e., the moving vehicle) and afford good visibility to the viewer of the signs (i.e., the driver of the vehicle), thus permitting the transmission of correct information.

Thus, retroreflective sheeting generally reflects light from a light source back toward the light source and hence affords good visibility in the direction of the light source. However, when the viewer is positioned in a direction different from that of the light source, its visibility is markedly reduced. Moreover, owing to the nature of retroreflective sheeting, the difference between the angle of incidence of light from the light source of a vehicle such as an automobile and the angle of observation of the driver of the vehicle increases as the light source comes nearer, resulting in a marked reduction in visibility. Recently, with the development of road systems and the diversification of provided information, the amount of information displayed on each sign is increasing. With consideration for the speed of vehicles, it may be very difficult for the drivers to read necessary information in a very short period of time when they are within the visible range of retroreflected light.

Accordingly; in the case of applications requiring the provision of more correct information, pronounced propaganda effects and the like, conventional retroreflective sheeting having retroreflectivity alone is limited in visibility. In particular, there is a strong demand for excellent retroreflective sheeting which can always afford good visibility to viewers at night even when the viewers are positioned in directions different from that of the light source.

In order to meet this demand, various attempts have been made to improve the visibility of retroreflective sheeting. For example, Japanese Patent Laid-Open No. 173008/'93 discloses encapsulated lens retroreflective sheeting having both retroreflectivity and light-storing luminosity wherein a transparent resin layer is used as a support for partially embedding retroreflective microspherical lenses (i.e., microspherical lenses having a deposited metal film coating the approximately hemispherical surfaces thereof and hence exhibiting retroreflectivity) and a layer of a light-storing luminescent substance is disposed on the back surface (i.e., the surface opposite to the light incidence side) of the support. However, owing to the structure of this retroreflective sheeting, the light radiating from the luminescent substance is intercepted by the embedded retroreflective microspherical lenses, so that the amount of light emitted thereby is very small. Consequently, this retroreflective sheeting is totally unsatisfactory for the purpose of improving visibility.

Moreover, the specification of PCT International Application Publication No. WO93/14422 discloses photoluminescent encapsulated cube-corner retroreflective sheeting which contains a phosphorescent pigment in the bonds for bonding the cube corner-forming surface to the support, and also suggests a method for imparting fluorescent properties to encapsulated lens retroreflective sheeting. However, even in the retroreflective sheeting described in the specification of this international application, the phosphorescent pigment fails to emit a sufficient amount of light. Consequently, signs made of this retroreflective sheeting will not have such a high degree of visibility that the information displayed thereby can be recognized from some distance.

Furthermore, the specification of PCT International Application Publication No. WO96/18920 discloses ultraviolet-excited luminous retroreflective sheeting of the encapsulated lens structure wherein the bonds at which a base sheet having retroreflective microspherical lenses partially embedded in a support is partly bonded to a protective film are formed on the protective film or base sheet as an ultraviolet-excited luminous layer by printing an ultraviolet-excited luminous resin composition, and these bonds are then fused to the base sheet or protective film by the application of heat or bonded thereto with the aid of a suitable adhesive. Moreover, this specification also suggests ultraviolet-excited luminous retroreflective sheeting wherein an ultraviolet-excited luminous support is prepared by forming the support of an ultraviolet-excited luminous resin composition or providing at least on the microspherical lens-embedding side of the support with an ultraviolet-excited luminous layer formed of an ultraviolet-excited luminous resin composition, and this support is partly heated and melt-formed by means of an embossing roll or the like to form bonds for bonding the protective film partly to the base sheet.

However, the retroreflective sheeting described in the specification of the aforementioned WO96/18920 involves problems in that the ultraviolet-excited luminous layer consists essentially of only the bonds for bonding the protective film to the base sheet and the proportion thereof to the total surface area of the retroreflective sheeting is very small and in that the amount of luminescent substance incorporated in the bonds cannot be increased so much. Consequently, it has been found that the amount of light emitted by the luminescent substance tends to be insufficient and, moreover, the retroreflective sheeting also has disadvantages such as poor adhesion of the ultraviolet-excited luminous layer to the protective film and difficulty in forming an adhesive layer on the formed ultraviolet-excited luminous layer.

On the other hand, several methods for embedding retroreflective microspherical lenses in some part of a support are also known. For example, U.S. Pat. No. 4,075,049 discloses a method for the preparation of a base sheet which comprises the steps of embedding the approximately hemispherical parts of glass beads in a temporary support (e.g., polyethylene-laminated paper) so as to form a mono-layer, depositing a lightreflecting material on the glass bead-bearing surface thereof, forcing part of the glass bead layer into the polyethylene layer of the temporary support by heating and pressing the glass bead-bearing side of the temporary support by means of a mold having a raised pattern, and pressing a support having an adhesive layer against the glass bead-bearing side of the temporary support to transfer the glass beads not buried in the polyethylene layer to the support.

However, the purpose of the method described in this U.S. patent lies in the fact that, in the fabrication of encapsulated lens retroreflective sheeting, the support of the base sheet is thermoformed by means of a mold having the same raised pattern as the raised pattern of the aforesaid mold so as not to incorporate glass beads in the bonds for bonding a protective film to the base sheet. Although this method may be employed in cases where it is desired to prevent a very small part of the glass bead layer from being transferred to the support, it is not easy to prevent a large part (e.g., more than half) of the glass bead layer from being transferred to the support and, therefore, this proposed method is not considered to be suitable in such cases.

It is an object of the present invention to provide lens type functional retroreflective sheeting which have both retroreflective regions and visual functionality presenting regions and hence exhibit good visibility even at night or the like, as well as methods of producing the same.

DISCLOSURE OF THE INVENTION

According to the present invention, there is provided lens type functional retroreflective sheeting comprising:

a base sheet consisting of a support comprising a functional resin layer containing a resin component and a functional pigment having light-storing or fluorescent properties, microspherical lens-embedding regions in which microspherical lenses with a deposited metal film coating the approximately hemispherical surfaces thereof are densely distributed on the surface of the functional resin layer of the support so as to form substantially a mono-layer, their approximately hemispherical surfaces coated with the deposited metal film are embedded in the functional resin layer, and their approximately hemispherical surfaces not coated with the deposited metal film are exposed on the functional resin layer, and microspherical lens-free regions in which essentially no microspherical lens is embedded and the functional resin layer is exposed;

a transparent protective film disposed above that surface of the base sheet on which microspherical lenses are exposed; and bonds at which the base sheet and the transparent protective film are partly bonded together so as to hold a layer of air between the layer of microspherical lenses and the transparent protective film, the retroreflective sheeting having retroreflective regions comprising those parts of the microspherical lens-embedding regions in which the bonds are not formed, and visual functionality presenting regions comprising at least the microspherical lens-free regions.

BRIEF DESCRIPTION OF THE DRAWINGS

FIG. 3 is a plan view of a temporary support having apertures formed by cutting out some parts thereof and affording a typical example of the temporary support used in the fabrication of lens type functional retroreflective sheeting in accordance with the present invention;

FIG. 4 is a schematic sectional view taken along line B—B in FIG. 3;

FIG. 9 is a series of schematic sectional views illustrating several steps of a method of producing lens type functional retroreflective sheeting in accordance with the present invention by using an ordinary temporary support and a relief mold (e.g., an embossing roll), instead of using the special temporary supports illustrated in FIGS. 3 to 6.

DETAILED DESCRIPTION OF THE INVENTION

The retroreflective sheeting of the present invention and the methods of producing the same are more specifically described hereinbelow with reference to FIGS. 1 to 9.

Figure 1:
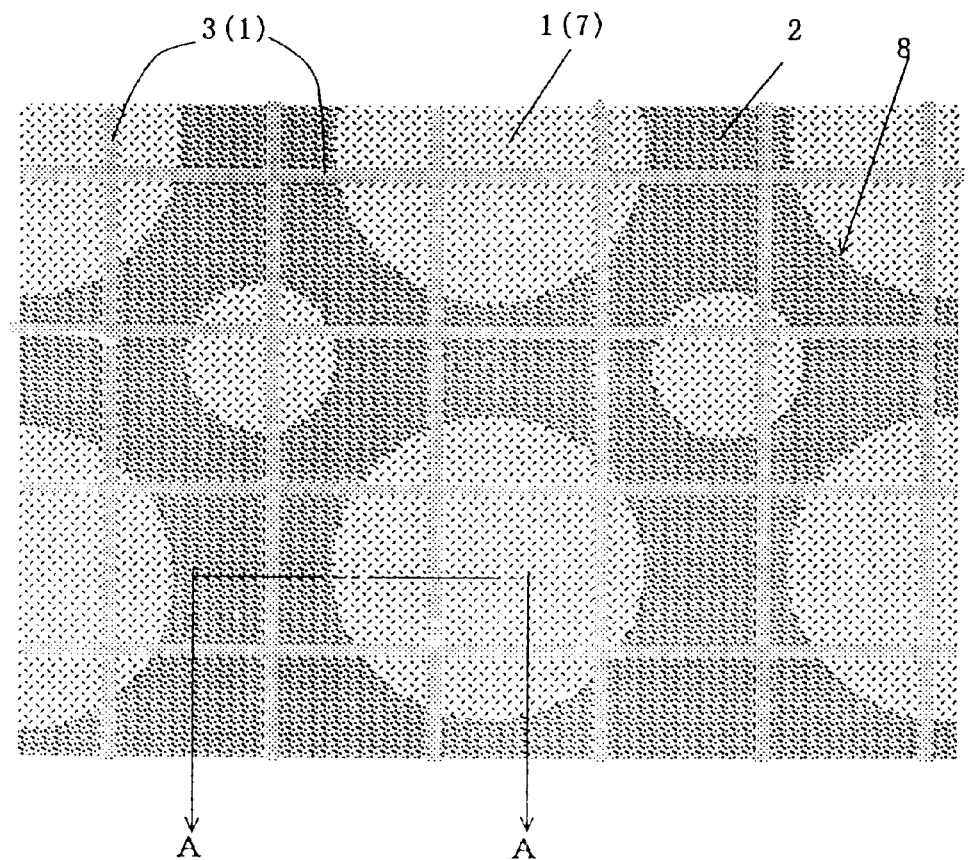
FIG. 1 is an example of a schematic plan view of encapsulated lens functional retroreflective sheeting in accordance with a preferred embodiment of the present invention as viewed from the light incidence side.
Figure 2:
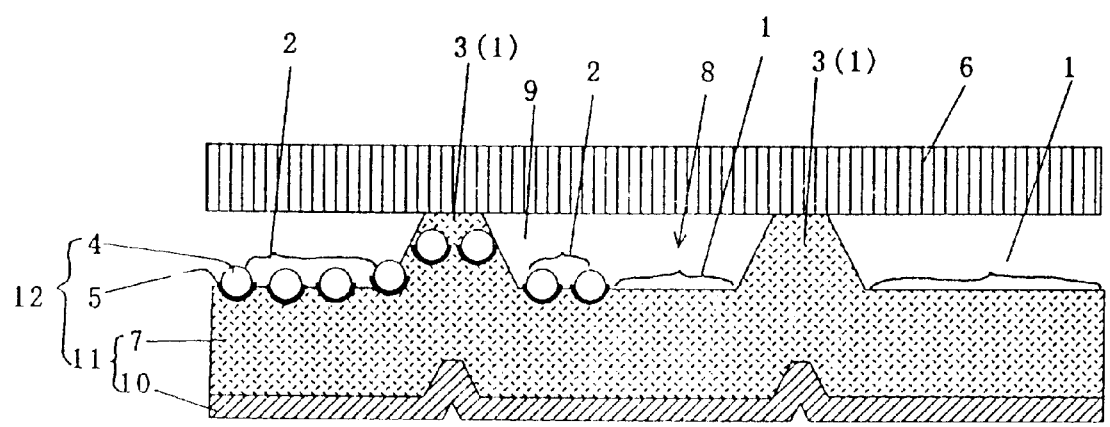
FIG. 2 is a schematic sectional view taken along line A—A in FIG. 1.

FIG. 1 is a plan view of encapsulated lens functional retroreflective sheeting affording a typical example of the lens type functional retroreflective sheeting of the present invention, and FIG. 2 is a sectional view taken along line A—A in FIG. 1.

In FIGS. 1 and 2, numerals 1 and 2 designate visual functionality presenting regions and retroreflective regions, respectively. Numeral 3 designates bonds, in the form of continuous lines, at which a base sheet and a transparent protective film 6 are bonded together. Thus, hermetically sealed microcells (i.e., capsules) 8 having a layer of air 9 enclosed therein are defined by bonds 3, transparent protective film 6 and base sheet 12. Moreover, bonds 3 shown in FIG. 2 have been formed by partially thermoforming a functional resin layer 7 according to a preferred embodiment of the present invention, and these bonds 3 themselves form part of visual functionality presenting regions 1. A support 11 consists essentially of functional resin layer 7 and, if necessary, may include a reinforcing layer 10 laminated to the back surface of functional resin layer 7. Base sheet 12 consists of support 11, microspherical lens-embedding regions formed on the light incidence side surface of functional resin layer 7 of support 11 and having embedded therein and supported thereby microspherical lenses 4 which have a deposited metal film 5 coating the approximately hemispherical surfaces thereof and hence exhibit retroreflectivity, and microspherical lens-free regions in which substantially no microspherical lens is embedded and the functional resin layer is exposed. In the microspherical lens-embedding regions, microspherical lenses 4 are densely distributed so as to form substantially a monolayer and their approximately hemispherical surfaces coated with deposited metal film 5 are embedded in and supported by functional resin layer 7. Consequently, their approximately hemispherical surfaces not coated with deposited metal film 5 are exposed on functional resin layer 7 and exhibit retroreflectivity. Of these microspherical lens-embedding regions, the parts in which bonds 3 are formed loses its retroreflectivity because the microspherical lenses are buried therein, but the other parts enclosed in capsules 8 constitute retroreflective regions 2. On the other hand, the microspherical lens-free regions positioned within capsules 8, together with bonds 3, constitute visual functionality presenting regions 1.

Functional resin layer 7 constituting support 11 contains a resin component and a functional pigment having light-storing or fluorescent properties. Examples of suitable functional pigments include light-storing pigments and ultraviolet-excited fluorescent pigments.

Light-storing pigments are pigments which store the energy of sunlight in the daytime and light radiating from fluorescent lamps, automobile headlamps or the like at night, and emit light gradually even in the dark after the irradiation with light is discontinued. No particular limitation is placed on the type of light-storing pigment used in the present invention, and any of organic light-storing pigments and inorganic light-storing pigments may be used. However, from the viewpoint of light-storing performance, inorganic light-storing pigments and, in particular, oxide type light-storing pigments are preferably used. Especially preferred are light-storing pigments comprising matrix crystals of a metal oxide of the general formula $MAl_2O_4$ (in which M represents at least one alkaline earth metal) containing rare earth metal atoms as an activator in an atomic fraction of $1\times10^{-6}$ to 0.2, more preferably $1\times10^{-5}$ to 0.15, based on the total number of alkaline earth metal (M) atoms and rare earth metal atoms.

As the aforesaid alkaline earth metal, it is preferable to use at least one metal selected from the group consisting of Ca, Ba and Sr. Moreover, the rare earth metal can be at least one metal selected from the group consisting of Sc, Y, La, Ce, Pr, Nd, Sm, Eu, Gd, Tb, Dy, Ho, Er, Tm, Yb and Lu. If necessary, the light-storing pigment may contain a coactivator comprising at least one metal selected from the group consisting of Mn, Sn and Bi, in an atomic fraction of $1\times10^{-6}$ to 0.2, more preferably $1\times10^{-5}$ to 0.15, based on the total number of alkaline earth metal (M) atoms, rare earth metal atoms and coactivator atoms.

Examples of such light-storing pigments include $SrAl_2O_4$:Eu, $SrAl_2O_4$:Eu, Dy, $SrAl_2O_4$:Eu, Nd, $SrAl_2O_4$:Eu, Pr, $SrAl_2O_4$:Eu, Sm, $SrAl_2O_4$:Eu, Tb, $SrAl_2O_4$:Eu, Ho, $SrAl_2O_4$:Eu, Mn, $SrAl_2O_4$: Eu, Sn, $SrAl_2O_4$:Eu, Bi, $CaAl_2O_4$:Eu, Nd, $CaAl_2O_4$:Eu, Sm, $CaAl_2O_4$:Eu, Tm, $CaAl_2O_4$:Eu, Nd, La, $CaAl_2O_4$:Eu, Nd, Ce, $CaAl_2O_4$:Eu, Nd, Pr, $CaAl_2O_4$:Eu, Nd, Sm, $CaAl_2O_4$:Eu, Nd, Gd, $CaAl_2O_4$:Eu, Nd, Tb, $CaAl_2O_4$:Eu, Nd, Dy, $CaAl_2O_4$:Eu, Nd, Ho, $CaAl_2O_4$:Eu, Nd, Er, $CaAl_2O_4$:Eu, Nd, Tm, $CaAl_2O_4$:Eu, Nd, Yb, $CaAl_2O_4$:Eu, Nd, Lu, $CaAl_2O_4$:Eu, Nd, Mn, $CaAl_2O_4$:Eu, Nd, Sn, $CaAl_2O_4$:Eu, Nd, Bi, $Ca_{0.9}Sr_{0.1}Al_2O_4$: Eu, Nd, La, $Ca_{0.9}Sr_{0.1}Al_2O_4$:Eu, Nd, Dy, $Ca_{0.7}Sr_{0.3}Al_2O_4$:Eu, Nd, Dy, $Ca_{0.9}Sr_{0.1}Al_2O_4$:Eu, Nd, Ho and $Ca_{0.7}Sr_{0.3}Al_2O_4$:Eu, Nd, Ho. These light-storing pigments may be used alone or in admixture of two or more.

These light-storing pigments should generally have an afterglow characteristic of not less than 150 mcd/m², preferably not less than 200 mcd/m², and more preferably not less than 250 mcd/m², as measured according to the following method.

Measurement of Afterglow Characteristic:

0.05 g of a light-storing pigment powder sample is weighed out, placed in an aluminum sample pan having an inner diameter of 8 mm, and allowed to stand in the dark for about 12 hours until the afterglow disappears. Thereafter, the sample is irradiated with a D65 common light source for 30 minutes at an iilluminance of 1,000 Ix, and allowed to stand in the dark for 10 minutes. Then, using a luminance meter ("LS-100"; manufactured by Minoruta Camera Co., Ltd.), the amount of light emitted by the sample is measured at a distance of about 30 cm from the sample and regarded as its afterglow characteristic.

The ultraviolet-excited fluorescent pigment which can be used as a functional pigment in the present invention is a pigment of the type emitting light upon excitation with the radiant energy of ultraviolet radiation. No particular limitation is placed on the type of the ultraviolet-excited fluorescent pigment used, and it may be arbitrarily selected from various fluorescent pigments including, for example, organic fluorescent pigments generally having relatively high light transmission properties, such as naphthotriazole pigments and benzoxazole pigments; and inorganic fluorescent pigments generally impervious to light, such as inorganic metallic salt pigments, metal halide pigments, metal oxide pigments and metal sulfide pigments. Preferred examples of the ultraviolet-excited fluorescent pigment are ones which emits visible light upon irradiation with ultraviolet radiation having a wavelength in the range of 250 to 400 nm.

Examples of the aforesaid organic fluorescent pigments include diaminostilbene, uranine, thioflavine T, eosine, rhodamine B and acridine orange; and organic pigments based on diphenylmethane dyes, triphenylmethane dyes, xanthene dyes, thiazine dyes, thiazole dyes and the like. These organic fluorescent pigments may be used alone or in admixture of two or more.

Examples of the inorganic fluorescent pigments include red light-emitting inorganic fluorescent pigments such as $Y_2O_3$:Eu, $Y(P,V)O_4$:Eu, $Y_2O_3S$:Eu, $0.5MgF_2 \cdot 3.5MgO \cdot GeO_2$:Mn, $YVO_4$:Eu and $(Y,Gd)BO_3$:Eu; green light-emitting inorganic fluorescent pigments such as $Zn_2GeO_4$:Mn, ZnO:Zn, ZnS:Cu, ZnS:(Cu,Al), (Zn,Cd)S:(Cu,Al), ZnS: (Cu,Au,Al), $Zn_2SiO_4$:Mn, ZnS:(Cu,Ag), (Zn,Cd)S:Cu, $Gd_2O_2S$:Tb, $La_2O_2S$:Tb, $Y_2SiO_5$:(Ce,Tb), $CeMgAl_{11}O_{19}$:Tb, ZnS:(Cu,Co), $LaOBr$:(Tb,Tm), $La_2O_2S$:Tb and $BaMg_2Al_{16}O_{27}$:(Eu, Mu); and blue light-emitting inorganic fluorescent pigments such as $Sr_5(PO_4)_3Cl$:Eu, $BaMg_2Al_{16}O_{27}$:Eu, $BaMgAl_{10}O_{17}$:Eu, ZnS:Ag, $CaWO_4$, $Y_2SiO_5$: Ce, ZnS:(Ag, Ga, Cl), $Sr_2P_2O_7$:Eu, CaS:Bi and CaSrS:Bi. Of these inorganic fluorescent pigments, those emitting light of the same color may be used alone or in admixture. Alternatively, in order to emit light in a desired tone of color, those emitting light of different colors may be used in admixture of two or more.

Since inorganic fluorescent pigments are generally more excellent in light resistance, thermal resistance, solvent resistance and the like than organic fluorescent pigments, inorganic fluorescent pigments are preferably used in cases where the resulting ultraviolet-excited retroreflective sheeting is to be used chiefly out of doors. Moreover, among inorganic fluorescent pigments, the above-described green light-emitting, red light-emitting and blue light-emitting inorganic fluorescent pigments may preferably be used because of the special advantage that they exhibit a high luminous intensity upon excitation with ultraviolet radiation and afford good visibility to viewers at night.

The inorganic fluorescent pigments should preferably have a particle diameter distribution containing 80% by weight or more of particles having a diameter of not greater than 25 μm, because they can be easily dispersed in the resin component and the resulting functional resin layer has good smoothness and few defects such as pinholes.

Where a light-storing pigment is used as the functional pigment in the practice of the present invention, the functional resin layer is a light-storing luminous resin layer and the visual functionality presenting regions are light-storing luminous regions. This light-storing luminous resin layer contains a light-storing pigment and a resin component, and the light-storing pigment may generally be present in an amount of 100 to 900 parts by weight, preferably 150 to 800 parts by weight, and more preferably 200 to 700 parts by weight, per 100 parts by weight of the resin component.

Where an ultraviolet-excited fluorescent pigment is used as the functional pigment in the practice of the present invention, the functional resin layer is an ultraviolet-excited luminous resin layer and the visual functionality presenting regions are ultraviolet-excited luminous regions. This ultraviolet-excited luminous resin layer contains an ultraviolet-excited fluorescent pigment and a resin component, and the ultraviolet-excited fluorescent pigment may generally be present in an amount of 10 to 600 parts by weight, preferably 50 to 400 parts by weight, and more preferbly 100 to 300 parts by weight, per 100 parts by weight of the resin component.

The resin components which can be used for the functional resin layer in the present invention include, for example, acrylic resins, polyurethane resins, polyester resins, vinyl chloride resins, vinyl acetate resins, polyolefin resins, fluororesins and polyamide resins. However, from the viewpoint of weather resistance and thermoformability, acrylic resins are preferably used.

If necessary, the functional resin layer may also contain, in addition to the functional pigment and the resin component, a crosslinking agent such as an isocyanate, melamine or metallic crosslinking agent. Thus, a three-dimensional crosslinked structure may be introduced into the resin component. However, it is preferable that parts of functional resin layer 7 can be thermally deformed by the application of heat and pressure to form bonds 3 at which base sheet 12 and transparent protective film 6 are partly bonded together. Accordingly, at least during the formation of bonds 3, functional resin layer 7 should preferably retain such a degree of fluidity as to permit the aforesaid thermoforming.

If necessary, functional resin layer 7 may further contain various fillers such as cellulosic resins, internally crosslinked microspherical resins, various colorants and thermal stabilizers. With consideration for the degree of functionality presentation (e.g., the magnitude of luminous intensity) when functional resin layer 7 acts as functionality presenting regions, the ease of thermal deformation in the bond-forming step which will be described later, and the like, the thickness of functional resin layer 7 is usually in the range of about 20 to about 250 μm and preferably about 30 to about 200 μm.

Support 11 used in the present invention may consist of functional resin layer 7 alone. Alternatively, if necessary, a reinforcing layer 10 may be laminated to the back side of functional resin layer 7 as illustrated in FIG. 2.

This reinforcing layer 10 may usually comprise a layer of a crosslinked resin. The resin component used may be suitably chosen from the resins which were enumerated above for the functional resin layer. The crosslinking agent used to crosslink the resin may also be the same as described above for the functional resin layer. Moreover, if necessary, the reinforcing layer may further contain white pigments such as titanium dioxide, extenders such as calcium carbonate and clay, various fillers described above for the functional resin layer, and the like.

With consideration for the weather resistance and mechanical strength of the resulting lens type functional retroreflective sheeting, the shape stability of the thermoformed parts, and the like, it is convenient that the thickness of reinforcing layer 10 is usually in the range of 10 to 80 μm and preferably 20 to 60 μm.

Moreover, if necessary, support 11 used in the present invention may have an intermediate layer disposed between functional resin layer 7 and reinforcing layer 10 for improving the adhesion of these layers. Thus, the overall thickness of support 11 used in the present invention is usually in the range of about 30 to bout 300 μm and preferably about 60 to about 250 μm.

In the present invention, the light incidence side surface of functional resin layer 7 of the support has formed therein microspherical lens-embedding regions in which retroreflective microspherical lenses 4 (i.e., microspherical lenses 4 whose approximately hemispherical surfaces are coated with deposited metal film 5) are embedded and supported, and microspherical lens-free regions in which substantially no microspherical lens is embedded and the functional resin layer is exposed. The microspherical lens-embedding regions are formed on parts of the light incidence side surface of functional resin layer 7 of support 11 so as to have any desired shapes and areas. In these microspherical lens-embedding regions, the microspherical lenses are present in such a state that they are densely distributed on the surface of the functional resin layer of the support so as to form substantially a mono-layer, their approximately hemispherical surfaces coated with the deposited metal film are embedded in the functional resin layer, and their approximately hemispherical surfaces not coated with the deposited metal film are exposed on the functional resin layer.

The embedded microspherical lenses 4 generally have an average particle diameter of 10 to 100 μm, preferably 30 to 80 μm, and more preferably 40 to 70 μm. The microspherical lenses should desirably have a refractive index of about 1.9, and glass beads are usually used.

In the present invention, no particular limitation is placed on the material of transparent protective film 6 disposed above that surface of base sheet 12 on which microspherical lenses 4 are exposed, provided that it has a total light transmittance of at least 20% or greater and preferably 40% or greater and it has a certain degree of flexibility. Useful materials include, for example, films made of acrylic resins, fluororesins, polyurethane resins, vinyl chloride resins, polycarbonate resins, polyester resins and polyolefin resins.

Moreover, transparent protective film 6 should preferably be unoriented. The reason for this is that, although a uniaxially or biaxially oriented film has improved mechanical strength, the residual strain in the film may detract from the durability of the resulting retroreflective sheeting. The thickness of transparent protective film 6 may vary widely according to the intended use of the resulting lens type functional retroreflective sheeting and the like. However, it is usually determined so as to be in the range of 20 to 200 μm, preferably 40 to 150 μm, and more preferably 50 to 100 μm.

In the present invention, base sheet 12 and transparent protective film 6 are partly bonded by bonds 3 so that a layer of air 9 is held between the layer of retroreflective microspherical lenses and transparent protective film 6. No particular limitation is placed on the method for forming these bonds 3. For example, they may be formed by printing a suitable bond-forming resin composition according to a screen printing or gravure printing technique. In this case, the bond-forming resin composition may be one consisting essentially of a resin component and having light transmission properties. However, if necessary, the bond-forming resin composition may contain the same functional pigment and other additives as used in functional resin layer 7. Moreover, similarly to functional resin layer 7, any of various crosslinking agents may be incorporated into the bond-forming resin composition to introduce a three-dimensional crosslinked structure into the resin component. No particular limitation is placed on the height of bonds 3 so formed, provided that micropherical lenses 4 can be completely buried therein. It is convenient that the thickness of bonds 3 is generally in the range of 10 to 100 μm, preferably 30 to 80 μm, and more preferably 40 to 70 μm.

Alternatively, bonds 3 may also be formed by partially thermoforming functional resin layer 7. One example of the method for forming bonds 3 in this manner is such that base sheet 12 is heated by means of a relief mold (e.g., an embossing roll) disposed on the back side of base sheet 12 and, at the same time, pressed between this relief mold and a back-up means (e.g., a rubber roll) disposed oppositely on the side of transparent protective film 6.

Of these methods for forming bonds 3, that based on thermoforming is preferred because a stabilized bonding strength is obtained in bonding transparent protective film 6 to base sheet 12 and because the equipment used for this purpose is simple and its operating conditions can be easily controlled.

No particular limitation is placed on the width of bonds 3 at which transparent protective film 6 is bonded to base sheet 12, provided that adequate adhesion is achieved between transparent protective film 6 and base sheet 12 and a predetermined proportion of retroreflective regions can be secured. However, it is desirable that, when viewed from the light incidence side, the width of bonds 3 is generally in the range of about 200 to about 1,000 μm, preferably about 250 to about 900 μm, and more preferably about 300 to about 800 μm.

When bonds 3 are formed in the form of continuous lines as illustrated in FIG. 1, hermetically sealed microcells (i.e., capsules) having a layer of air 9 enclosed therein are defined by bonds 3, transparent protective film 6 and base sheet 12. This is preferable in that, even if the resulting lens type functional retroreflective sheeting is used outdoors for a long period of time, the deterioration of its properties (e.g., retroreflectivity and visual functionality such as light-storing or ultraviolet-excited luminous properties) due to the infiltration of rainwater or the like into the capsules is minimized.

When viewed from the light incidence side, the size of the aforesaid capsules 8 should generally be in the range of about 3 to about 100 mm$^2$, preferably about 5 to about 70 mm$^2$, and more preferably about 7 to about 50 mm$^2$, in order to maintain the surface smoothness of the lens type functional retroreflective sheeting by minimizing the deformation of the protective film itself which tends to result from the formation of capsules, and in order to minimize the amount of dirt, dust, rainwater and the like entering the broken capsules through the cut ends when the lens type functional retroreflective sheeting is cut into pieces of desired shape and used outdoors.

Alternatively, bonds 3 may be formed in the form of dots or discontinuous lines. In this case, however, it is desirable to cut the resulting lens type functional retroreflective sheeting into piece of desired shape according to its intended use and seal their periphery by a suitable means, so that rainwater or the like may be prevented from infiltrating into the spaces between transparent protective film 6 and the support during outdoor use. To this end, it is preferable to form functional resin layer 7 of a thermoplastic resin and heat-seal the periphery prior to use.

The resulting lens type functional retroreflective sheeting of the present invention has retroreflective regions 2 comprising microspherical lens-embedding regions having a layer of retroreflective microspherical lenses embedded therein, exclusive of bonds 3, and covered on the light incidence side with transparent protective film 6 through the intervention of a layer of air 9, and visual functionality presenting regions 1 (light-storing luminous regions or ultraviolet-excited luminous regions) comprising bonds 3 and microspherical lens-free regions. In the case of encapsulated lens functional retroreflective sheeting in which bonds 3 are formed in the form of continuous lines as illustrated in FIG. 1, the parts of capsules 8 in which a layer of microspherical lenses 4 is enclosed constitute retroreflective regions 2, and the remaining parts of capsules 8 and bonds 3 constitute visual functionality presenting regions 1.

In the lens type functional retroreflective sheeting of the present invention, the proportions of the area of retroreflective regions 2 and the area of visual functionality presenting regions 1 cannot necessarily be defined to be fixed because they may vary, for example, according to the intended use of the sheeting, the functionality to be presented, and the type of the functionality (i.e., light-storing or ultraviolet-excited luminous properties). However, from the viewpoint of the balance between retroreflectivity and the degree of visual functionality presentation (e.g., luminous intensity) and other factors, it is generally suitable that the proportion of the area of retroreflective regions 2 is usually in the range of 10 to 70%, preferably 15 to 50%, and the proportion of the area of visual functionality presenting regions 1 is usually in the range of 30 to 90%, preferably 50 to 85%, based on the total area of the light incidence side surface of the retroreflective sheeting.

More specifically, where visual functionality presenting regions 1 are light-storing luminous regions, the proportion of the area of the retroreflective regions may generally be in the range of 10 to 50%, preferably 15 to 40%, and the proportion of the area of the light-storing luminous regions may generally be in the range of 90 to 50%, preferably 85 to 60%, based on the total area of the light incidence side surface of the retroreflective sheeting. On the other hand, where visual functionality presenting regions 1 are ultraviolet-excited luminous regions, the proportion of the area of the retroreflective regions may generally be in the range of 10 to 70%, preferably 15 to 60%, and more preferably 30 to 50%, and the proportion of the area of the ultraviolet-excited luminous regions may generally be in the range of 90 to 30%, preferably 85 to 40%, and more preferably 70 to 50%, based on the total area of the light incidence side surface of the retroreflective sheeting.

The above-described lens type functional retroreflective sheeting of the present invention may be made, for example, according to a method (hereinafter referred to as "the method of the present invention") comprising the steps of:

(a) providing a temporary support having been subjected to a treatment for preventing microspherical lenses from being temporarily embedded in some parts thereof, supporting a large number of microspherical lenses on those parts of the temporary support which allow microspherical lenses to be temporarily embedded, in such a way that the microspherical lenses are densely distributed so as to form substantially a mono-layer and the approximately hemispherical surfaces thereof are embedded in the temporary support, and thereby preparing a temporary microspherical lens-supporting sheet comprising the temporary support having the microspherical lenses embedded in some parts thereof;

(b) depositing a metal on the microspherical lens-bearing surface of the temporary microspherical lens-supporting sheet to form a deposited metal film on those approximately hemispherical surfaces of the microspherical lenses which project above the temporary support;

(c) separately preparing a support having a functional resin layer containing a resin component and a functional pigment having light-storing or fluorescent properties, superposing the support on the temporary microspherical lens-supporting sheet in such a way that the functional resin layer side of the support comes into contact with the microspherical lens surfaces projecting above the temporary microspherical lens-supporting sheet and having the deposited metal film, and pressing and laminating the resulting assembly to embed the deposited metal film-bearing approximately hemispherical surfaces of the microspherical lenses in the functional resin layer of the support;

(d) stripping the temporary support from the resulting laminate to transfer the microspherical lenses to the functional resin layer of the support; and (e) superposing a transparent protective film on the resulting base sheet having the microspherical lenses embedded in the functional resin layer, in such a way that the transparent protective film rests on those deposited metal film-free approximately hemispherical surfaces of the microspherical lenses which project above the base sheet, and using a relief mold disposed on the back side of the base sheet to partially thermoform the functional resin layer of the base sheet by the application of heat and pressure and thereby form bonds for bonding the transparent protective film partly to the base sheet.

Figure 5:
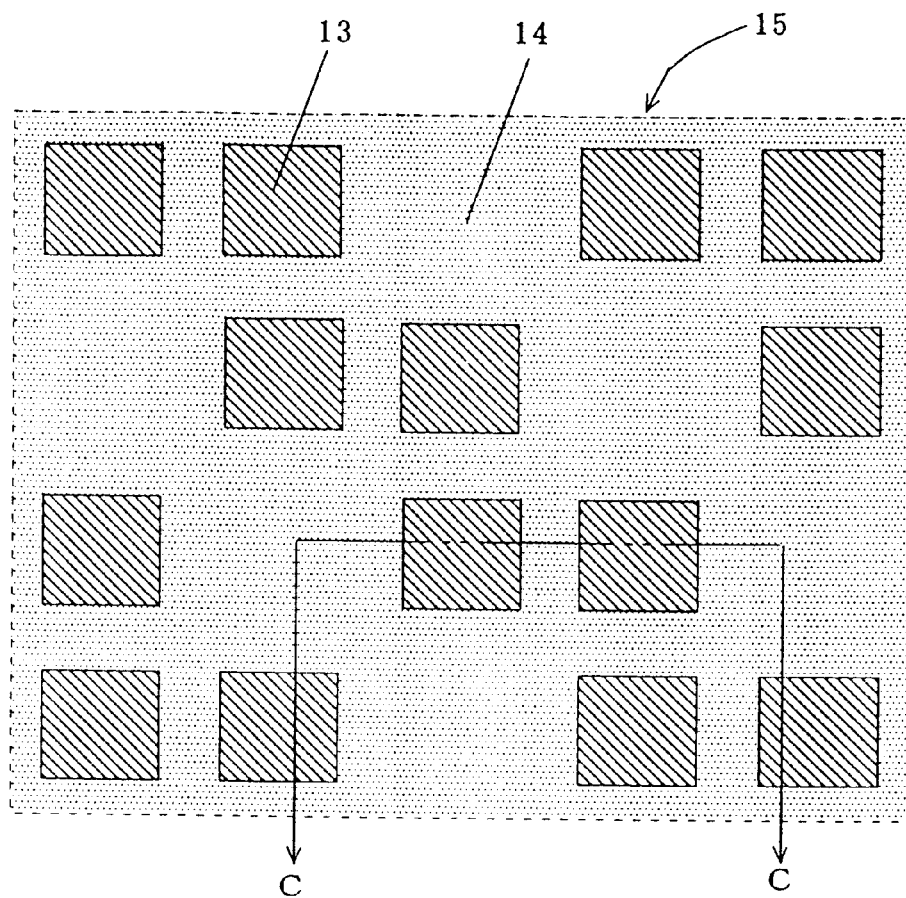
FIG. 5 is a plan view of a temporary support having a temporary microspherical lens-embedding layer formed in some parts thereof and affording another typical example of the temporary support used in the fabrication of lens type functional retroreflective sheeting in accordance with the present invention.
Figure 6:
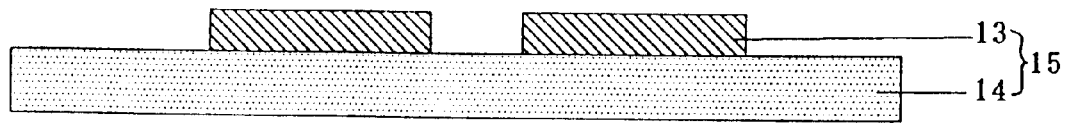
FIG. 6 is a sectional view taken along line C—C in FIG. 5.

FIGS. 3 and 5 are plan views showing typical examples of the temporary support having been subjected to a treatment for preventing microspherical lenses from being temporarily embedded in some parts thereof which support is used in the above-described step (a) for the purpose of producing the lens type functional retroreflective sheeting of the present invention. FIGS. 4 and 6 are sectional views taken along line B—B in FIG. 3 and line C—C in FIG. 5, respectively.

The temporary support shown in FIGS. 3 and 4 is a temporary support having apertures formed by cutting out some parts thereof as "the treatment for preventing microspherical lenses from being temporarily embedded in some parts thereof." In FIGS. 3 and 4, temporary support 15 consists of a temporary microspherical lens-embedding layer 13 for embedding microspherical lenses 4, and a backing layer 14 for supporting temporary microspherical lens-embedding layer 13, and has apertures 16 formed therein.

No particular limitation is placed on the material of this temporary support 15, provided that it performs the function of embedding microspherical lenses 4. Although any material that is known per se may be used, polyethylene-laminated paper using a polyethylene film as temporary microspherical lens-embedding layer 13 and paper as backing layer 14 is most preferred. Moreover, no particular limitation is placed on the method for forming apertures 16 in some parts of temporary support 15, and any of various methods such as rotary die cutting, roll die cutting and blanking may be mentioned. Furthermore, no particular limitation is placed on the shape of apertures 16, and any desired shapes may be used alone or in suitable combination. However, circular apertures are preferred from the viewpoint of the strength of the temporary support. From the viewpoint of the strength of the temporary support and the balance between the retroreflectivity of the resulting lens type functional retroreflective sheeting and the degree of visual functionality presented thereby, the area of apertures 16 should usually be in the range of 30 to 70% based on the surface area of the temporary support before cutting out.

The temporary support illustrated in FIGS. 5 and 6 is a temporary support having a temporary microspherical lens-embedding layer 13 formed in some parts thereof as "the treatment for preventing microspherical lenses from being temporarily embedded in some parts thereof." In FIGS. 5 and 6, temporary support 15 consists of a temporary microspherical lens-embedding layer 13 formed in some parts thereof to embed microspherical lenses 4, and a backing layer 14 for supporting temporary microspherical lens-embedding layer 13.

Similarly to the embodiment described above in connection with FIGS. 3 and 4, no particular limitation is placed on the material of temporary microspherical lens-embedding layer 13 in this temporary support 15, provided that it performs the function of embedding microspherical lenses 4. Paper may be used as backing layer 14. Moreover, no particular limitation is placed on the type of the resin used for the formation of temporary microspherical lens-embedding layer 13, and thermoplastic resins such as vinyl chloride resins, acrylic resins, polyvinyl alcohol resins, polyvinyl butyral resins, vinylidene chloride resins, polyurethane resins, cellulosic resins and polyester resins may be used. However, acrylic resins, polyvinyl alcohol resins, vinylidene chloride resins and the like are preferably used, for example, because they facilitate the formation of a temporary microspherical lens-embedding layer and they have a low softening temperature and can hence be sufficiently deformed by the application of heat to embed microspherical lenses.

It is usually convenient that the formation of the aforesaid temporary microspherical lens-embedding layer 13 is carried out according to a continuous printing technique such as rotary screen printing or gravure printing. No limitation is placed on the shape of temporary microspherical lens-embedding layer 13, and any desired shape may be suitably chosen. From the viewpoint of the balance between the retroreflectivity of the resulting lens type functional retroreflective sheeting and the degree of visual functionality presented thereby, the area of the parts in which temporary microspherical lens-embedding layer 13 is formed should usually be in the range of 10 to 70% based on the surface area of the temporary support.

Figure 7:
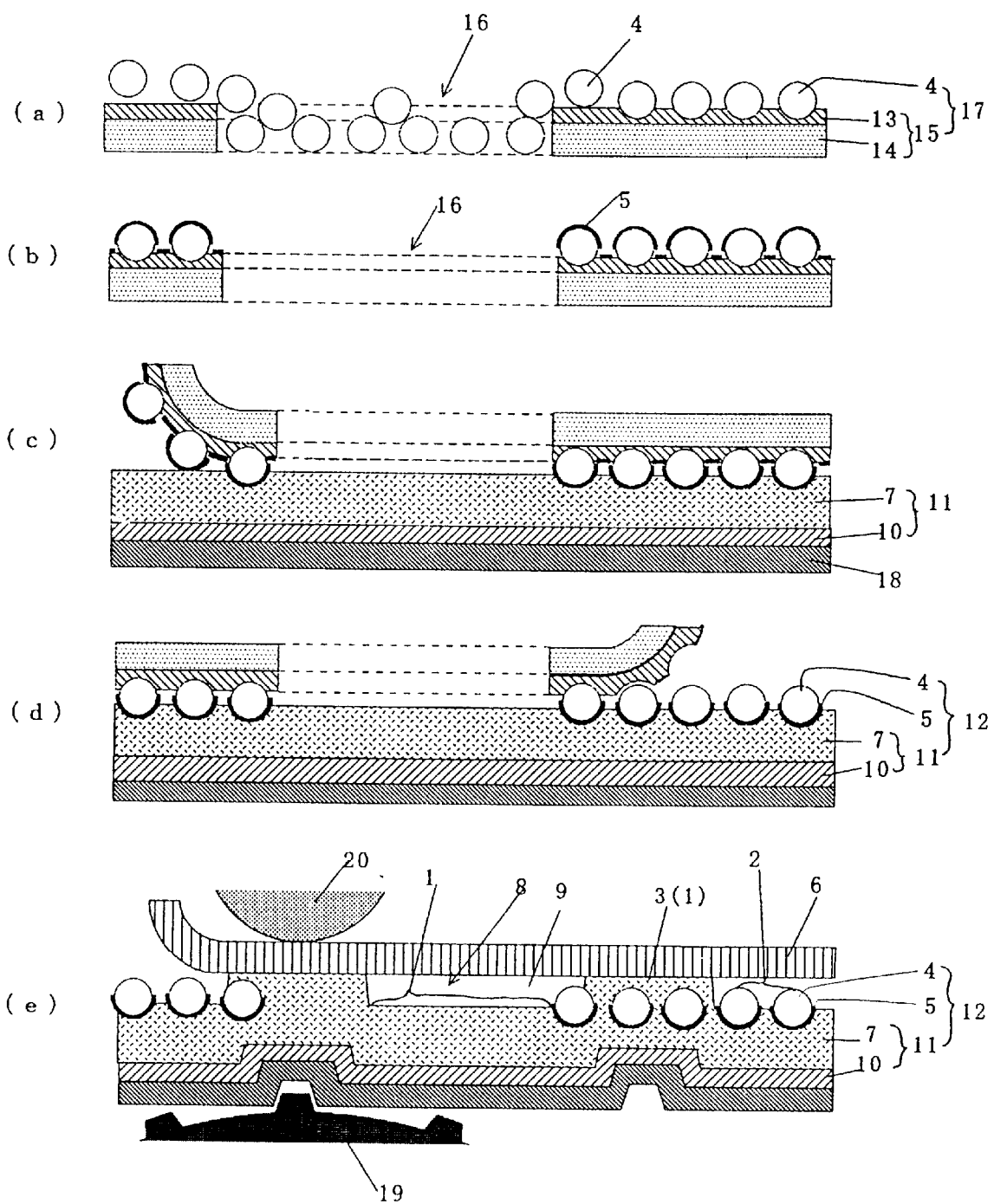
FIG. 7 is a series of schematic sectional views illustrating several steps of a method of producing lens type functional retroreflective sheeting in accordance with the present invention by using the temporary support illustrated in FIGS. 3 and 4.

FIG. 7 is a series of schematic sectional views illustrating several steps of the method of the present invention in which lens type functional retroreflective sheeting is made by using the temporary support illustrated in FIGS. 3 and 4.

FIG. 7(a) illustrates step (a) in the method of the present invention, i.e., the step of preparing a temporary microspherical lens-supporting sheet by embedding microspherical lenses in temporary support 15 having apertures 16 formed by cutting out some parts thereof.

Specifically, for example, polyethylene-laminated paper 15 having apertures 16 formed therein is heated to about 110° C., and glass beads 4 serving as microspherical lenses are densely scattered over the softened polyethylene film 13 thereof. Then, using nip rolls or the like, glass beads 4 are pressed into polyethylene film 13 in such a way that they are embedded therein to a depth equal to about ⅓ to ½ of the diameter thereof and they are densely distributed so as to form substantially a mono-layer. In this step, glass beads 4 are not embedded in apertures 16 of temporary support 15. Consequently, after polyethylene film 13 is cooled, glass beads present in apertures 16, together with unembedded excess glass beads remaining on polyethylene film 13, are removed from polyethylene-laminated paper 15 by a suitable means such as vibration, air blowing or suction. Thus, there is obtained a temporary glass bead- (or microspherical lens-)supporting sheet 17 in which, in the parts other than apertures 16, glass beads 4 are embedded in such a way that they are densely distributed so as to form a mono-layer.

FIG. 7(b) illustrates step (b) in the method of the present invention, i.e., the metal deposition step. In this step, according to a vacuum evaporation process or the like, a metal (e.g., aluminum) used as a light reflecting element is deposited on that side of temporary microspherical lens-supporting sheet 17 to which microspherical lenses 4 are attached, so that a deposited metal film 5 is formed. No particular limitation is placed on the type of the metal used in this step, provided that it can be deposited by vacuum evaporation. However, aluminum is most preferred because it has conventionally been used in retroreflective sheeting and can readily be obtained at low cost.

FIG. 7(c) illustrates step (c) in the method of the present invention, i.e., the step of preparing a support 11 and embedding the microspherical lenses therein.

Specifically, support 11 is prepared in the following manner: A process film 18 comprising, for example, a polyethylene terephthalate film whose surfaces have been made releasable by treatment with a silicone resin release agent is provided, and a reinforcing layer-forming resin composition containing a crosslinkable resin component (e.g., a hydroxyl-containing acrylic resin) and a crosslinking agent (e.g., an isocyanate crosslinking agent) is applied onto process film 18 and dried to form a reinforcing layer 10. Then, a functional resin layer-forming composition containing a functional pigment (e.g., a light-storing pigment or an ultraviolet-excited fluorescent pigment) and a resin component (e.g., an acrylic resin) is applied directly onto reinforcing layer 10 and dried to form a functional resin layer 7, or a functional resin layer 7 obtained by applying the functional resin layer-forming composition onto another process film and drying it is laminated to reinforcing layer 10. Thus, there is obtained a support 11 comprising a laminate of functional resin layer 7 and reinforcing layer 10.

Then, the resulting support 11 is superposed on temporary microspherical lens-supporting sheet 17 having glass beads embedded in the parts other than apertures 16 as prepared in step (a), in such a way that functional resin layer 7 of support 11 comes into contact with the deposited metal film (5)-bearing surfaces of microspherical lenses 4 projecting above temporary microspherical lens-supporting sheet 17. While the resulting assembly is heated, if necessary, to soften functional resin layer 7, this assembly is pressed and laminated by means of nip rolls or the like to embed the deposited metal film (5)-bearing approximately hemispherical surfaces of microspherical lenses 4 in functional resin layer 7 to a depth equal to about ⅙ to ½ of the diameter thereof. In this step, the deposited metal film present on temporary microspherical lens-supporting sheet 17 between microspherical lenses 4 should be prevented from coming into direct contact with the surface of functional resin layer 7 so that the deposited metal film may not be transferred to the surface of functional resin layer 7.

Specifically, this can be accomplished, for example, by superposing support 11 on temporary microspherical lens-supporting sheet 17 so as to leave a space between functional resin layer 7 and temporary microspherical lens-supporting sheet 17; or by forming a film for preventing the deposited metal film present between microspherical lenses 4 from being transferred to the surface of functional resin layer 7 (e.g., a resin film comprising an acrylic resin or other resin containing a silane coupling agent) before superposing functional resin layer 7 on the metal-coated microspherical lens-bearing surface of temporary microspherical lens-supporting sheet 17. Since no spherical lens is present in apertures 16 of temporary microspherical lens-supporting sheet 17, functional resin layer 7 is divided into regions in which microspherical lenses 4 are embedded and regions in which no microspherical lens is embedded.

FIG. 7(d) illustrates step (d) in the method of the present invention, i.e., the temporary support stripping step. In this step, according to a method well known in this technical field, temporary support 15 is stripped from the laminate obtained in step (c). Thus, there is obtained a base sheet 12 having both microspherical lens-embedding regions in which the deposited metal film (5)-bearing approximately hemispherical parts of microspherical lenses 4 are embedded in functional resin layer 7 and the deposited metal film (5)-free approximately hemispherical surfaces of microspherical lenses 4 project above functional resin layer 7, and microspherical lens-free regions in which no microspherical lens is embedded and the surface of functional resin layer 7 is exposed.

FIG. 7(e) illustrates step (e) in the method of the present invention, i.e., the bond forming step. A transparent protective film 6 is superposed on the microspherical lens-bearing side of the aforesaid base sheet 12 obtained in step (d). Then, base sheet 12 is heated by means of a relief mold (e.g., an embossing roll 19) disposed on the back side of base sheet 12 [i.e., on the reinforcing layer (10) side of base sheet 12 in FIG. 7(e)] and, at the same time, pressed between this relief mold and a back-up means (e.g., a rubber roll 20) disposed oppositely on the side of transparent protective film 6. Consequently, parts of functional resin layer 7 of base sheet 12 are thermoformed to form bonds for bonding transparent protective film 6 partly to base sheet 12. Thus, there is obtained lens type functional retroreflective sheeting in accordance with the present invention.

Figure 8:
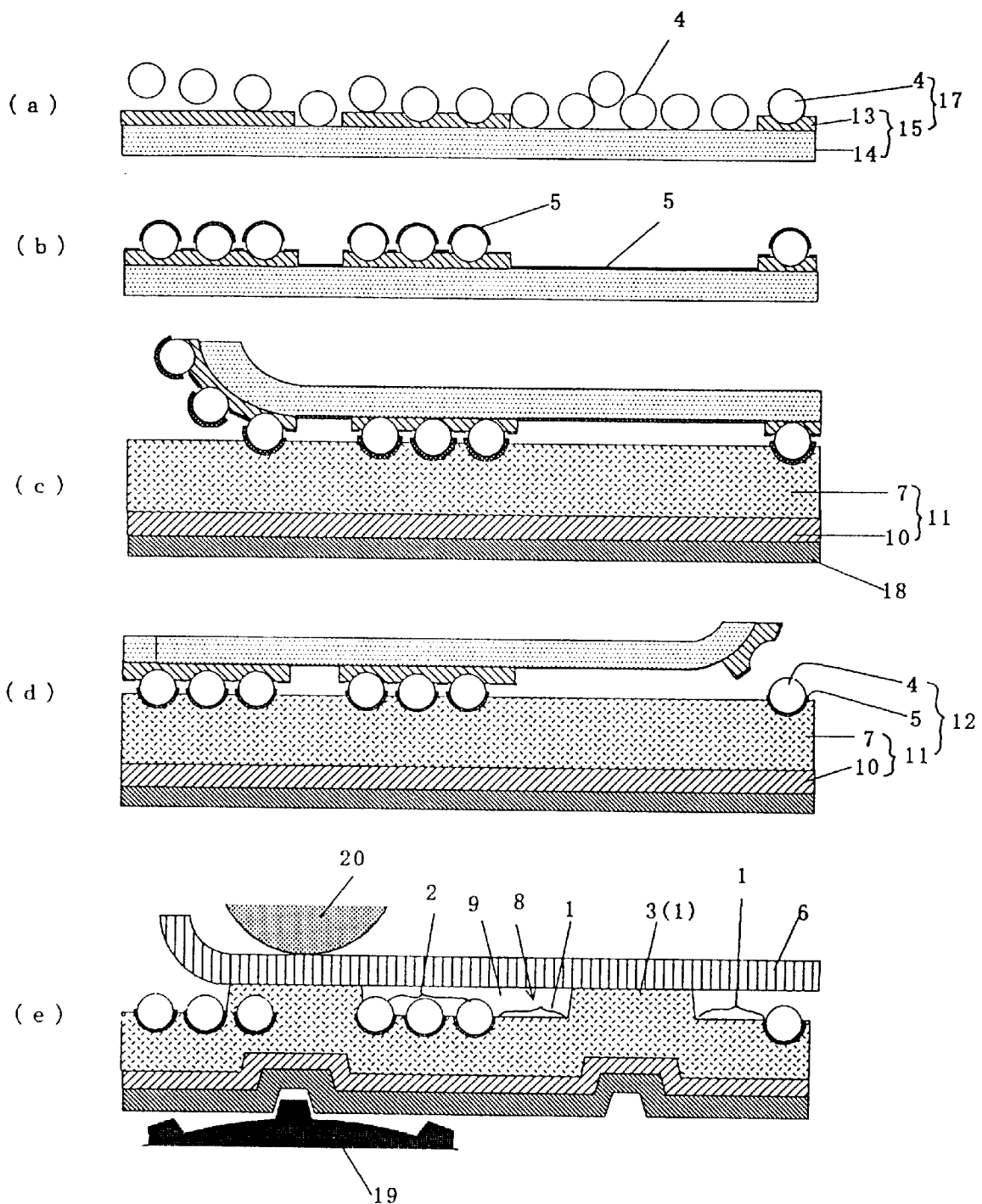
FIG. 8 is a series of schematic sectional views illustrating several steps of a method of producing lens type functional retroreflective sheeting in accordance with the present invention by using the temporary support illustrated in FIGS. 5 and 6.

FIG. 8 is a series of schematic sectional views illustrating several steps of the method of the present invention in which lens type functional retroreflective sheeting is made by using the temporary support illustrated in FIGS. 5 and 6;

FIG. 8(a) illustrates step (a) in the method of the present invention, i.e., the step of preparing a temporary microspherical lens-supporting sheet by embedding microspherical lenses in temporary support 15 having temporary microspherical lens-embedding layer 13 formed in some parts thereof.

Specifically, a temporary support 15 comprising kraft paper 14 having a temporary microspherical lens-embedding layer 13 formed on some parts thereof so as to have a suitable shape (e.g., the shape of squares as viewed from the light incidence side) is provided. This temporary support 15 is heated to about 100° C., and glass beads 4 serving as microspherical lenses are densely scattered thereover. Then, using nip rolls or the like, glass beads 4 are pressed into temporary microspherical lens-embedding layer 13 in such a way that they are embedded therein to a depth equal to about ⅓ to ½ of the diameter thereof and they are densely distributed so as to form substantially a mono-layer. In this step, glass beads 4 are not embedded in those parts of temporary support 15 in which temporary microspherical lens-embedding layer 13 is not formed. Consequently, after the resin of this temporary microspherical lens-embedding layer 13 is cooled, glass beads present in these parts, together with unembedded excess glass beads remaining on temporary microspherical lens-embedding layer 13, are removed from temporary support by a suitable means such as vibration, air blowing or suction. Thus, there is obtained a temporary glass bead- (or microspherical lens-)supporting sheet 17 in which, only in the parts bearing temporary microspherical lens-embedding layer 13, glass beads 4 are embedded in such a way that they are densely distributed so as to form a mono-layer.

FIG. 8(*b*) illustrates step (b) in the method of the present invention, i.e., the metal deposition step. Specifically, this step is carried out in substantially the same manner as described previously in connection with FIG. 7(*b*).

FIG. 8(*c*) illustrates step (c) in the method of the present invention, i.e., the step of preparing a support 11 and embedding the microspherical lenses therein. Specifically, this step is carried out in the same manner as described previously in connection with FIG. 7(*c*), except that temporary glass bead-supporting sheet 17 having glass beads embedded only in the parts bearing temporary microspherical lens-embedding layer 13 as prepared with reference to FIG. 8(*a*) is used in place of temporary microspherical lens-supporting sheet 17 having glass beads embedded in the parts other than apertures 16 as prepared with reference to FIG. 7(*a*).

FIGS. 8(*d*) and 8(*e*) illustrate steps (d) and (e) in the method of the present invention, i.e., the temporary support stripping step and the bond forming step. These steps may be carried out in exactly the same manner as described previously in connection with FIGS. 7(*d*) and 7(*e*). Thus, there is obtained lens type functional retroreflective sheeting in accordance with the present invention.

On the other hand, FIG. 9 is a series of schematic sectional views illustrating several steps of another method of producing lens type functional retroreflective sheeting in accordance with the present invention by using an ordinary temporary support 15 (e.g., polyethylene-laminated paper) and a relief mold (e.g., an embossing roll), instead of using the special temporary supports 15 illustrated in FIGS. 3 to 6.

FIGS. 9(*a*) and 9(*b*) illustrate the step of preparing a temporary microspherical lens-supporting sheet 17 according to a conventionally known method and the step of depositing a metal on this sheet 17. Specifically, these steps may be carried out in the same manner as described previously in connection with FIGS. 7(*a*) and 7(*b*), except that, as temporary support 15, an ordinary temporary support having no aperture is used in place of the temporary support having apertures formed by cutting out some parts thereof.

FIG. 9(*c*) illustrates the step of embedding microspherical lenses in a functional resin layer 7, which step forms a characteristic feature of this method.

A support 11 comprising a laminate of a functional resin layer 7 and a reinforcing layer 10 is prepared in the same manner as described previously in connection with FIG. 7(*c*), and superposed on the metal-coated temporary microspherical lens-supporting sheet 17 prepared as illustrated in FIG. 9(*b*). In this step, support 11 is superposed on temporary microspherical lens-supporting sheet 17 in such a way that functional resin layer 7 of support 11 comes into contact with the deposited metal film (5)-bearing surfaces of microspherical lenses 4 projecting above temporary microspherical lens-supporting sheet 17.

Then, using a relief mold 21 (e.g., an embossing roll, mesh roll or gravure roll) disposed on the back side of temporary microspherical lens-supporting sheet 17 [i.e., on the backing layer (10) side of temporary microspherical lens-supporting sheet 17 in this FIG. 9(*c*)], the resulting assembly is heated, if necessary, to soften functional resin layer 7. At the same time, this assembly is pressed between this relief mold 21 and a back-up means (e.g., a rubber roll 22) disposed oppositely on the side of support 11. Thus, the deposited metal film (5)-bearing approximately hemispherical surfaces of microspherical lenses 4 are embedded in functional resin layer 7 to a depth equal to about ⅙ to ½ of the diameter thereof. During this process, the microspherical lenses embedded in functional resin layer 7 are only those present substantially in the parts pressed by relief mold 21, so that functional resin layer 7 produces regions in which microspherical lenses 4 are embedded and regions in which no microspherical lens is embedded. Accordingly, the raised surface of relief mold 21 used may have a shape corresponding to that of the microspherical lens-embedding regions of the base sheet.

Alternatively, in this step of embedding microspherical lenses in a functional resin layer 7, relief mold 21 may be disposed on the back side of support 11 (i.e., on the side of PET process film 18), as contrasted with this FIG. 9(*c*). That is, the assembly obtained by superposing support 11 on temporary microspherical lens-supporting sheet 17 may be pressed between this relief roll 21 and back-up means 22 disposed oppositely on the backing layer (14) side of temporary microspherical lens-supporting sheet 17. Thus, microspherical lenses 4 can be embedded only in those parts of functional resin layer 7 which are pressed by relief mold 21.

Moreover, in this step, the deposited metal film present on temporary microspherical lens-supporting sheet 17 between microspherical lenses 4 should be prevented from coming into direct contact with the surface of functional resin layer 7 so that the deposited metal film may not be transferred to the surface of functional resin layer 7. To this end, there may be used any of the specific means described previously in connection with the step of FIG. 7(*c*).

FIGS. 9(*d*) and 9(*e*) illustrate the temporary support stripping step and the bond forming step. These steps may be carried out in exactly the same manner as described previously in connection with FIGS. 7(*d*) and 7(*e*). Thus, there is obtained lens type functional retroreflective sheeting in accordance with the present invention.

EXAMPLES

The present invention is more specifically explained with reference to the following examples. Retroreflectivity, the afterglow brightness and visibility rating of light-storing luminous retroreflective sheeting, and the ultraviolet-excited luminous brightness and visibility rating of ultraviolet-excited luminous retroreflective sheeting were measured or evaluated according to the following procedures.

(1) Retroreflectivity

Using a MODEL 920 retroreflectivity measuring instrument (manufactured by Advanced Retro Technology, INC.), the amount of light retroreflected by a 100 mm×100 mm sample of luminous retroreflective sheeting was measured according to JIS Z9117 at an angle of observation of 0.2° and an angle of incidence of 5°. Measurements were made with respect to five suitably chosen points and the measured values were averaged to determine the retroreflectivity of the sample.

(2) Afterglow Brightness of Light-storing Luminous Retroreflective Sheeting

After a 100 mm×100 mm sample of light-storing luminous retroreflective sheeting was allowed to stand in the dark for 12 hours, the sample was irradiated with a D65 common light source for 30 minutes at an illuminance of 1,000 lx, and allowed to stand in the dark for 10 minutes. Then, using a luminance meter ("LS-100"; manufactured by Minoruta Camera Co., Ltd.), the intensity of afterglow in an about 5 mmΦ spot was measured at a distance of about 30 cm from the sample. Measurements were made with respect to five suitably chosen positions and the afterglow brightness of the light-storing luminous retroreflective sheeting was determined according to the following equation.

Afterglow brightness $(mcd/m^2)$ =

(Average intensity of afterglow in light-storing luminous regions)×

(percentage of area of light-storing luminous regions)÷100

(3) Visibility Rating of Light-storing Luminous Retroreflective Sheeting

A letter "N" was cut out from light-storing luminous retroreflective sheeting and affixed to a 300 mm×300 mm aluminum plate as a display sign. On the other hand, the background was formed of encapsulated lens retroreflective sheeting ["Nikka Light ULS F806" (blue); manufactured by Nikka Polymer Co., Ltd.]. The specimen so prepared was allowed to stand in the dark for 12 hours. Thereafter, the specimen was irradiated with a D65 common light source for 30 minutes at an illuminance of 1,000 lx, and allowed to stand in the dark for 8 hours. Then, the visibility of the specimen was evaluated by 20 male and female persons, aged 18 to 50, at a distance of about 30 m from the specimen. The degree of visibility was rated on the following basis, and the visibility rating of the specimen was expressed by the average value.

5: Very clearly visible.
4: Moderately visible.
3: Barely visible.
2: Vaguely visible (the letter is hardly discernible).
1: Completely invisible.

(4) Ultraviolet-excited Luminous Brightness of Ultraviolet-excited Luminous Retroreflective Sheeting An ultraviolet light irradiator comprising four 10W ultraviolet light-emitting fluorescent lamps was provided. On the front side, this irradiator was fitted with a visible light cut-off filter so as to radiate near ultraviolet light ranging in wavelength from 300 nm to 420 nm with a dominant wavelength of about 360 nm. Using this irradiator, a 100 mm×100 mm sample was irradiated from above so that the surface of the ultraviolet-excited luminous regions received a radiant energy 0.88 mW/cm². Then, using a luminance meter ("LS-100"; manufactured by Minoruta Camera Co., Ltd.), the luminous brightness in an about 5 mmΦ spot was measured at a distance of about 30 cm right above the sample. Measurements were made with respect to five suitably chosen positions and the average ultraviolet-excited luminous brightness of the ultraviolet-excited luminous retroreflective sheeting was determined according to the following equation.

Ultraviolet-excited luminous brightness $(cd/m^2)$ of ultraviolet-excited luminous retroreflective sheeting =

(Average ultraviolet-excited luminous brightness of ultraviolet-excited luminous regions)×

(percentage of area of ultraviolet-excited luminous regions)÷100

(5) Visibility Rating of Ultraviolet-excited Luminous Retroreflective Sheeting

Letters were cut out from ultraviolet-excited luminous retroreflective sheeting and affixed to a 2,200 mm×2,700 mm aluminum plate as a display sign. On the other hand, the background was formed of encapsulated lens retroreflective sheeting ["Nikka Light ULS F806" (blue); manufactured by Nikka Polymer Co., Ltd.]. The information board so made was installed in such a way that the distance between its lower end and the ground was about 4 m and the surface of the board was disposed almost vertically. A floodlight projector comprising a 400W high-pressure mercury-vapor lamp was installed at a position 5 meters away from the point just below the middle of the width of the information board in a direction forming an angle of 45° with the surface thereof, and adjusted so that the whole surface of the information board was irradiated with ultraviolet light.

Then, the visibility of the specimen was evaluated at night by 20 male and female persons, aged 18 to 50, at a position which was about 50 meters away from the point just below the middle of the width of the information board in a direction perpendicular to the surface of the information board and lay 5 meters rightward facing the information board. The degree of visibility was rated on the following basis, and the visibility rating of the information board was expressed by the average value.

5: Very clearly visible.
4: Moderately visible.
3: Barely visible.
2: Vaguely visible (the letters are hardly discernible).
1: Completely invisible.

Example 1

In a temporary support prepared by laminating an about 20 μm thick polyethylene (PE) layer to paper, a plurality of apertures in the shape of large and small circles as shown in FIG. 3 were formed by cutting out parts thereof with a rotary die cutter. The total area of the apertures was about 65% based on the surface area of the temporary support before cutting out.

The temporary support having apertures formed therein was heated to about 105° C. Then, glass beads having an average diameter of about 65 μm and a refractive index of about 1.91 were scattered thereover in such a way that they were evenly and densely distributed so as to form a monolayer, and pressed with nip rolls to embed the glass beads in the PE layer to a depth equal to about ⅓ of the diameter thereof. Thereafter, excess glass beads were removed by a spray of air to obtain a temporary glass bead-supporting sheet. Then, according to a vacuum evaporation process, aluminum was deposited on that surface of the temporary glass bead-supporting sheet on which the glass beads were exposed. Thus, a vacuum-evaporated film having a thickness of about 0.1 μm was formed on the approximately hemispherical surfaces of the glass beads.

Next, an about 20 μm thick polyethylene terephthalate (PET) process film which had been made releasable by treatment with silicone resin was provided, and a mixed solution composed of 100 parts by weight of an acrylic resin solution [a methyl isobutyl ketone (MIBK)/toluene (1/1) solution of an acrylic resin prepared by copolymerizing 20% by weight of methyl methacrylate (MMA), 65% by weight of ethyl acrylate (EA) and 15% by weight of 2-hydroxyethyl methacrylate (HEMA) and having a solid content of 50% by weight], 21.5 parts by weight of rutile-type titanium dioxide, and 14.2 parts by weight of a hexamethylene diisocyanate (HMDI)-based crosslinking agent having a solid content of 75% by weight [in the form of a 1-methoxypropyl acetate-2/xylene (1/1) solution] was applied onto the aforesaid process film and dried to form a reinforcing layer having a thickness of about 30 μm.

Thereafter, a light-storing luminous resin composition obtained by mixing 100 parts by weight of an acrylic resin solution different from the above-described one [a MIBK/toluene (1/1) solution of an acrylic resin prepared by copolymerizing 40% by weight of MMA, 55% by weight of EA and 5% by weight of HEMA and having a solid content of 50% by weight] with 120 parts by weight of an inorganic oxide type light-storing pigment ("N-Yako"; manufactured by Nemoto Special Chemicals Co., Ltd.) was applied onto the aforesaid reinforcing layer and dried to form a light-storing luminous resin layer having a thickness of about 250 μm. Thus, there was obtained a support comprising a laminate of a reinforcing layer and a light-storing luminous resin layer.

The previously prepared temporary glass bead-supporting sheet was superposed on this support in such a way that the metal-coated side of the glass beads positioned on the temporary glass bead-supporting sheet faced the light-storing luminous resin layer surface of the support. This assembly was heated to 85° C. under pressure to embed the glass beads in the light-storing luminous resin layer of the support to a depth equal to about ⅓ of the diameter thereof. Then, the temporary support was stripped from the resulting temporary glass bead-supporting sheet/support laminate to obtain a base sheet having a polka-dotted appearance comprising glass bead-embedding regions in which the deposited metal film-free approximately hemispherical surfaces of the glass beads were exposed on the surface thereof, and glass bead-free regions in which no glass bead was embedded. In this base sheet, the areas of the glass bead-embedding regions and the glass bead-free regions were about 35% and about 65%, respectively, based on the total area of the surface on which the glass beads were exposed.

After this base sheet was aged at 35° C. for 14 days to bring the crosslinking of the reinforcing layer to substantial completion, an about 50 μm thick acrylic resin film ("Acriprene"; manufactured by Mitsubishi Rayon Co., Ltd.) used as a transparent protective film was superposed on that surface of the base sheet to which the glass beads had been transferred. This assembly was passed between a metallic embossing roll having network-like relief with a line width of 1.3 mm and heated to a surface temperature of about 190° C. and a rubber roll heated to a surface temperature of about 60° C., in such a way that the transparent protective film came into contact with the rubber roll. As a result, the base sheet was pressed against the metallic embossing roll from the side of the PET process film to melt and partially thermoform the base sheet and thereby bond the base sheet to the transparent protective sheet. Thus, there was obtained light-storing luminous retroreflective sheeting of the encapsulated lens structure having retroreflective regions and light-storing luminous regions.

The areas of the retroreflective regions and the light-storing luminous regions in the light-storing luminous retroreflective sheeting thus obtained, and the retroreflectivity, afterglow brightness and visibility thereof are shown in Table 1 which will be given later. As can be seen from these data, this retroreflective sheeting was an excellent product having good visibility even at night and meeting the purpose of the present invention.

Example 2

A temporary glass bead-supporting sheet was obtained in the same manner as in Example 1, except that an ordinary temporary support prepared by laminating an about 20 μm thick polyethylene (PE) layer to paper and having no apertures formed therein was used in place of the temporary support having apertures formed therein. Then, according to a vacuum evaporation process, aluminum was deposited on its surface on which the glass beads were exposed. Thus, a vacuum-evaporated film having a thickness of about 0.1 μm was formed on the approximately hemispherical surfaces of the glass beads.

On the other hand, using an about 20 μm thick PET process film which had been made releasable, a support comprising a laminate of a reinforcing layer and a light-storing luminous resin layer was formed in the same manner as in Example 1.

Next, the previously prepared temporary glass bead-supporting sheet was superposed on this support in such a way that the metal-coated side of the glass beads positioned on the temporary glass bead-supporting sheet faced the light-storing luminous resin layer surface of the support. This assembly was passed between a metallic embossing roll having network-like relief with a line width of 1.3 mm and heated to a surface temperature of about 130° C. and a rubber roll heated to a surface temperature of about 60° C., in such a way that the temporary glass bead-supporting sheet came into contact with the metallic embossing roll. Thus, only in those parts of the temporary glass bead-supporting sheet which were pressed by the raised pattern of the metallic embossing roll, the glass beads were embedded in the light-storing luminous resin layer to a depth equal to about ⅓ of the diameter thereof. Thereafter, the procedure of Example 1 was repeated to obtain a base sheet divided into glass bead-embedding regions in which the deposited metal film-free approximately hemispherical surfaces of the glass beads were exposed on the surface thereof, and glass bead-free regions in which no glass bead was embedded. In this base sheet, the areas of the glass bead-embedding regions and the glass bead-free regions were about 47% and about 53%, respectively, based on the total area of the surface on which the glass beads were exposed.

After this base sheet was aged at 35° C. for 14 days to bring the crosslinking of the reinforcing layer to substantial completion, it was worked up in substantially the same manner as in Example 1. Thus, there was obtained light-storing luminous retroreflective sheeting of the encapsulated lens structure having retroreflective regions and light-storing luminous regions.

The areas of the retroreflective regions and the light-storing luminous regions in the light-storing luminous retroreflective sheeting thus obtained, and the retroreflectivity, afterglow brightness and visibility thereof are shown in Table 1 which will be given later. As can be seen from these data, this retroreflective sheeting was an excellent product having good visibility even at night and meeting the purpose of the present invention.

Example 3

In the step of partially transferring the glass beads as described in Example 2, the assembly was passed between a metallic embossing roll heated to a surface temperature of about 130° C. and a rubber roll heated to a surface temperature of about 60° C. in the same manner as in Example 2, except that the PET process film attached to the support was brought into contact with the metallic embossing roll instead of bringing the temporary glass bead-supporting sheet into contact with the metallic embossing roll. Thus, only in those parts of the light-storing luminous resin layer which were pressed by the raised pattern of the metallic embossing roll, the glass beads were embedded in the light-storing luminous resin layer to a depth equal to about ⅓ of the diameter thereof. Thereafter, the procedure of Example 1 was repeated to obtain a base sheet divided into glass bead-embedding regions in which the deposited metal film-free approximately hemispherical surfaces of the glass beads were exposed on the surface thereof, and glass bead-free regions in which no glass bead was embedded. In this base sheet, the areas of the glass bead-embedding regions and the glass bead-free regions were about 47% and about 53%, respectively, based on the total area of the surface on which the glass beads were exposed.

Thereafter, this base sheet was worked up in substantially the same manner as in Example 1. Thus, there was obtained light-storing luminous retroreflective sheeting of the encapsulated lens structure having retroreflective regions and light-storing luminous regions.

The areas of the retroreflective regions and the light-storing luminous regions in the light-storing luminous retroreflective sheeting thus obtained, and the retroreflectivity, afterglow brightness and visibility thereof are shown in Table 1 which is given below. As can be seen from these data, this retroreflective sheeting was an excellent product having good visibility even at night and meeting the purpose of the present invention.

TABLE 1

| | Light-storing luminous regions (%) | Retroreflective regions (%) | Retroreflectivity (cd/lx · cm$^2$) | Afterglow brightness (mcd/m$^2$) | Visibility rating |
|---|---|---|---|---|---|
| Example 1 | 77 | 23 | 77 | 91 | 4 |
| Example 2 | 67 | 33 | 155 | 160 | 5 |
| Example 3 | 67 | 33 | 150 | 140 | 5 |

Example 4

In Example 1, instead of the step in which a light-storing luminous resin composition obtained by mixing 100 parts by weight of an acrylic resin solution [containing a copolymer of MMA/EA/HEMA=40/55/5 (% by weight) and having a solid content of 50% by weight] with 120 parts by weight of a light-storing pigment ("N-Yako"; manufactured by Nemoto Special Chemicals Co., Ltd.) was applied and dried to form a light-storing luminous resin layer having a thickness of about 250 μm, a step was carried out in which an ultraviolet-excited luminous resin composition obtained by mixing 100 parts by weight of the same acrylic resin solution with 120 parts by weight of an ultraviolet-excited inorganic oxide type fluorescent pigment ["Aurorainbow A-160" (green); manufactured by Nemoto Special Chemicals Co., Ltd.] was applied and dried to form an ultraviolet-excited luminous resin layer having a thickness of about 100 μm. Excepting this, a support comprising a laminate of a reinforcing layer and a green light-emitting ultraviolet-excited luminous resin layer was prepared in substantially the same manner as in Example 1.

Thereafter, in substantially the same manner as in Example 1, glass beads were embedded in the ultraviolet-excited luminous resin layer of the aforesaid support to obtain a base sheet having a polka-dotted appearance comprising glass bead-embedding regions in which the deposited metal film-free approximately hemispherical surfaces of the glass beads were exposed on the surface thereof, and glass bead-free regions in which no glass bead was embedded. In this base sheet, the areas of the glass bead-embedding regions and the glass bead-free regions were about 35% and about 65%, respectively, based on the total area of the surface on which the glass beads were exposed. After this base sheet was aged at room temperature for 20 days to bring the crosslinking of the reinforcing layer to substantial completion, it was worked up in substantially the same manner as in Example 1. Thus, there was obtained ultraviolet-excited luminous retroreflective sheeting of the encapsulated lens structure having retroreflective regions and ultraviolet-excited (green) luminous regions.

The areas of the retroreflective regions and the ultraviolet-excited luminous regions in the ultraviolet-excited luminous retroreflective sheeting thus obtained, and the retroreflectivity, ultraviolet-excited luminous brightness and visibility thereof are shown in Table 2 which will be given later. As can be seen from these data, this retroreflective sheeting was an excellent product having good visibility even at night and meeting the purpose of the present invention.

Example 5

A support comprising a laminate of a reinforcing layer and a red light-emitting ultraviolet-excited luminous resin layer was prepared in the same manner as in Example 4, except that 120 parts by weight of a red light-emitting inorganic fluorescent pigment ["A-120"; manufactured by Nemoto Special Chemicals Co., Ltd.] was used in place of 120 parts by weight of the ultraviolet-excited inorganic oxide type fluorescent pigment ["Aurorainbow A-160" (green); manufactured by Nemoto Special Chemicals Co., Ltd.].

Thereafter, the procedure of Example 4 was repeated to obtain a base sheet having a polka-dotted appearance comprising glass bead-embedding regions in which the deposited metal film-free approximately hemispherical surfaces of the glass beads were exposed on the surface thereof, and glass bead-free regions in which no glass bead was embedded. In this base sheet, the areas of the glass bead-embedding regions and the glass bead-free regions were about 35% and about 65%, respectively, based on the total area of the surface on which the glass beads were exposed. After this base sheet was aged at room temperature for 20 days to bring the crosslinking of the reinforcing layer to substantial completion, it was worked up in the same manner as in Example 4. Thus, there was obtained ultraviolet-excited luminous retroreflective sheeting of the encapsulated lens structure having retroreflective regions and ultraviolet-excited (red) luminous regions.

The areas of the retroreflective regions and the ultraviolet-excited luminous regions in the ultraviolet-excited luminous retroreflective sheeting thus obtained, and the retroreflectivity, ultraviolet-excited luminous brightness and visibility thereof are shown in Table 2 which will be given later. As can be seen from these data, this retroreflective sheeting was an excellent product having good visibility even at night and meeting the purpose of the present invention.

Example 6

Using a rotary screen, an acrylic resin solution [containing a copolymer of MMA/EA=34/66 (% by weight) and having a solid content of 50% by weight] was printed on kraft paper having a basis weight of 78 g/m$^2$ so as to form square patterns as shown in FIG. 5. Thus, there was obtained a temporary support on which a glass bead-embedding resin layer having a dry thickness of about 20 $\mu$m was formed. The total area of the parts in which the glass bead-embedding resin layer was formed was about 50% based on the surface area of the temporary support.

The temporary support thus obtained was heated to about 100° C. Then, glass beads similar to those used in Example 1 were scattered thereover in such a way that they were evenly and densely distributed so as to form a mono-layer, and pressed with nip rolls to embed the glass beads in the glass bead-embedding resing layer (the acrylic resin layer) to a depth equal to about ⅓ of the diameter thereof. Thereafter, excess glass beads were removed by a spray of air to obtain a temporary glass bead-supporting sheet. Then, according to a vacuum evaporation process, aluminum was deposited on that surface of the temporary glass bead-supporting sheet on which the glass beads were exposed. Thus, a vacuum-evaporated film having a thickness of about 0.1 $\mu$m was formed on the approximately hemispherical surfaces of the glass beads.

Then, a support comprising a laminate of a reinforcing layer and a green light-emitting ultraviolet-excited luminous resin layer was prepared in the same manner as in Example 4. Thereafter, the procedure of Example 4 was repeated to obtain a base sheet comprising square glass bead-embedding regions in which the deposited metal film-free approximately hemispherical surfaces of the glass beads were exposed on the surface thereof, and glass bead-free regions in which no glass bead was embedded. In this base sheet, the areas of the glass bead-embedding regions and the glass bead-free regions were about 50% and about 50%, respectively, based on the total area of the surface on which the glass beads were exposed. After this base sheet was aged at room temperature for 20 days to bring the cross linking of the reinforcing layer to substantial completion, it was worked up in substantially the same manner as in Example 4. Thus, there was obtained ultraviolet-excited luminous retroreflective sheeting of the encapsulated lens structure having retroreflective regions and ultraviolet-excited (green) luminous regions.

The areas of the retroreflective regions and the ultraviolet-excited luminous regions in the ultraviolet-excited luminous retroreflective sheeting thus obtained, and the retroreflectivity, ultraviolet-excited luminous brightness and visibility thereof are shown in Table 2. As can be seen from these data, this retroreflective sheeting was an excellent product having good visibility even at night and meeting the purpose of the present invention.

Example 7

In Example 2, a support comprising a laminate of a reinforcing layer and a green light-emitting ultraviolet-excited luminous resin layer was prepared in the same manner as in Example 4, instead of preparing a support comprising a laminate of a reinforcing layer and a light-storing luminous resin layer. Thereafter, in substantially the same manner as in Example 2, glass beads were embedded in the ultraviolet-excited luminous resin layer of the aforesaid support to obtain a base sheet divided into glass bead-embedding regions in which the deposited metal film-free approximately hemispherical surfaces of the glass beads are exposed on the surface thereof, and glass bead-free regions in which no glass bead was embedded. In this base sheet, the areas of the glass bead-embedding regions and the glass bead-free regions were about 47% and about 53%, respectively, based on the total area of the surface on which the glass beads were exposed. After this base sheet was aged at 35° C. for 14 days to bring the crosslinking of the reinforcing layer to substantial completion, it was worked up in substantially the same manner as in Example 1. Thus, there was obtained ultraviolet-excited luminous retroreflective sheeting of the encapsulated lens structure having retroreflective regions and ultraviolet-excited (green) luminous regions.

The areas of the retroreflective regions and the ultraviolet-excited luminous regions in the ultraviolet-excited luminous retroreflective sheeting thus obtained, and the retroreflectivity, ultraviolet-excited luminous brightness and visibility thereof are shown in Table 2 which will be given later. As can be seen from these data, this retroreflective sheeting was an excellent product having good visibility even at night and meeting the purpose of the present invention.

Example 8

In Example 7, a support comprising a laminate of a reinforcing layer and a red light-emitting ultraviolet-excited luminous resin layer was prepared in the same manner as in Example 5, instead of preparing a support comprising a laminate of a reinforcing layer and a green light-emitting ultraviolet-excited luminous resin layer. Thereafter, the procedure of Example 5 was repeated to obtain a base sheet divided into glass bead-embedding regions in which the deposited metal film-free approximately hemispherical surfaces of the glass beads are exposed on the surface thereof, and glass bead-free regions in which no glass bead was embedded. In this base sheet, the areas of the glass bead-embedding regions and the glass bead-free regions were about 47% and about 53%, respectively, based on the total area of the surface on which the glass beads were exposed. After this base sheet was aged at 35° C. for 14 days to bring the crosslinking of the reinforcing layer to substantial completion, it was worked up in substantially the same manner as in Example 1. Thus, there was obtained ultraviolet-excited luminous retroreflective sheeting of the encapsulated lens structure having retroreflective regions and ultraviolet-excited (red) luminous regions.

The areas of the retroreflective regions and the ultraviolet-excited luminous regions in the ultraviolet-excited luminous retroreflective sheeting thus obtained, and the retroreflectivity, ultraviolet-excited luminous brightness and visibility thereof are shown in Table 2 which will be given later. As can be seen from these data, this retroreflective sheeting was an excellent product having good visibility even at night and meeting the purpose of the present invention.

TABLE 2

| | Ultraviolet-excited luminous regions (%) | Retroreflective regions (%) | Retroreflectivity (cd/lx · cm$^2$) | Ultraviolet-excited luminous brightness (cd/m$^2$) | Visibility rating |
|---|---|---|---|---|---|
| Example 4 | 76 | 24 | 80 | 271 | 5 |
| Example 5 | 77 | 23 | 82 | 69 | 5 |
| Example 6 | 67 | 33 | 111 | 235 | 5 |
| Example 7 | 67 | 33 | 150 | 192 | 5 |
| Example 8 | 67 | 33 | 148 | 48 | 5 |

EFFECTS OF THE INVENTION

As described above, the lens type functional retroreflective sheeting of the present invention not only reflects light (e.g., sunlight) in the daytime and exhibit good visibility, but also functions at night in such a way that its retroreflective regions reflect light from a light source (e.g., automobile headlamps) back toward the light source and thereby afford good visibility to viewers positioned in the direction of the light source (e.g., automobile drivers). Moreover, where the visual functionality presenting regions are light-storing luminous regions, these regions store sunlight in the daytime and light radiating from fluorescent lamps, automobile headlamps or the like at night, emit light gradually even in the dark in which there is no light source, and thereby afford good luminosity or night visibility to drivers, pedestrians and the like.

Furthermore, where the visual functionality presenting regions are ultraviolet-excited luminous regions, these regions emit light upon exposure to ultraviolet light, and thereby afford good visibility at night to viewers positioned in directions different from the that of the light source.

We claim:

1. Lens type functional retroreflective sheeting having retroreflective regions and non-retroreflective luminous visual regions comprising:
    a base sheet comprising a support comprising
        a functional resin layer comprising a resin component and at least one functional light emitting pigment having light-storing or fluorescent properties,
        microspherical lens-embedding regions in which microspherical lenses with a deposited metal film coating the approximately hemispherical surfaces thereof are densely distributed on the surface of the functional resin layer of the support so as to form substantially a mono-layer, their approximately hemispherical surfaces coated with the deposited metal film are embedded in the functional resin layer, and their approximately hemispherical surfaces not coated with the deposited metal film are exposed on the functional resin layer, and
        microspherical lens-free regions in which substantially no microspherical lens is embedded and the functional resin layer is exposed;
    a transparent protective film disposed above that surface of said base sheet on which microspherical lenses are exposed; and
    bonds at which said base sheet and said transparent protective film are partly bonded together so as to hold a layer of air between the layer of microspherical lenses and said transparent protective film,
    said retroreflective sheeting having retroreflective regions comprising those parts of the microspherical lens-embedding regions in which said bonds are not formed, and visual functionality presenting regions comprising at least the microspherical lens-free regions.

2. Lens type functional retroreflective sheeting as claimed in claim 1 wherein said bonds are in the form of continuous lines and, in cooperation with said base sheet and said transparent protective film, define a large number of hermetically sealed microcells.

3. Lens type functional retroreflective sheeting as claimed in claim 1 wherein said bonds have been formed by partially thermoforming the functional resin layer.

4. Lens type functional retroreflective sheeting as claimed in claim 1 wherein the proportions of the area of said retroreflective regions and the area of said visual functionality presenting regions are 10 to 60% and 40 to 90%, respectively, based on the total area of the light incidence side surface of said retroreflective sheeting.

5. Lens type functional retroreflective sheeting as claimed in claim 1 wherein the functional pigment is at least one light-storing pigment, the functional resin layer is a light-storing luminous resin layer, and said visual functionality presenting regions are light-storing luminous regions.

6. Lens type functional retroreflective sheeting as claimed in claim 5 wherein the light-storing pigment comprises an oxide type light-storing pigment.

7. Lens type functional retroreflective sheeting as claimed in claim 6 wherein the light-storing pigment is an oxide type light-storing pigment comprising matrix crystals of a metal oxide of the general formula $MAl_2O_4$ (in which M represents at least one alkaline earth metal) containing rare earth metal atoms as an activator in an atomic fraction of $1 \times 10^{-6}$ to 0.2 based on the total number of alkaline earth metal (M) atoms and rare earth metal atoms.

8. Lens type functional retroreflective sheeting as claimed in claim 7 wherein the alkaline earth metal is at least one metal selected from the group consisting of Ca, Ba and Sr.

9. Lens type functional retroreflective sheeting as claimed in claim 7 wherein the rare earth metal is at least one metal selected from the group consisting of Sc, Y, La, Ce, Pr, Nd, Sm, Eu, Gd, Tb, Dy, Ho, Er, Tm, Yb and Lu.

10. Lens type functional retroreflective sheeting as claimed in claim 7 wherein, the light-storing pigment further contains a coactivator comprising at least one metal selected from the group consisting of Mn, Sn and Bi, in an atomic fraction of $1 \times 10^{-6}$ to 0.2 based on the total number of alkaline earth metal (M) atoms, rare earth metal atoms and coactivator metal atoms.

11. Lens type functional retroreflective sheeting as claimed in claim 5 wherein the light-storing luminous resin layer contains the light-storing pigment in an amount of 100 to 900 parts by weight per 100 parts by weight of the resin component.

12. Lens type functional retroreflective sheeting as claimed in claim 5 wherein the light-storing pigment has an afterglow characteristic of not less than 150 mcd/m$^2$.

13. Lens type functional retroreflective sheeting as claimed in claim 5 wherein the light-storing pigment has an afterglow characteristic of not less than 250 mcd/m$^2$.

14. Lens type functional retroreflective sheeting as claimed in claim 1 wherein the functional pigment comprises an ultraviolet-excited fluorescent pigment, the functional resin layer is an ultraviolet-excited luminous resin layer, and said visual functionality presenting regions are ultraviolet-excited luminous regions.

15. Lens type functional retroreflective sheeting as claimed in claim 14 wherein the ultraviolet-excited fluorescent pigment is at least one inorganic fluorescent pigment.

16. Lens type functional retroreflective sheeting as claimed in claim 15 wherein the ultraviolet-excited fluorescent pigment is an inorganic fluorescent pigment containing at least one member selected from the group consisting of red light-emitting inorganic fluorescent pigments, green light -emitting inorganic fluorescent pigments and blue light-emitting inorganic fluorescent pigments.

17. Lens type functional retroreflective sheeting as claimed in claim 15 or 16 wherein the inorganic fluorescent pigment has a particle diameter distribution containing 80% by weight or more of particles having a diameter of not greater than 25 μm.

18. Lens type functional retroreflective sheeting as claimed in claim 14 wherein the ultraviolet-excited fluorescent pigment emits light upon irradiation with ultraviolet radiation having a wavelength in the range of 250 to 400 nm.

19. Lens type functional retroreflective sheeting as claimed in claim 14 wherein the ultraviolet-excited luminous resin layer contains the ultraviolet-excited fluorescent pigment in an amount of 10 to 600 parts by weight per 100 parts by weight of the resin component.

20. Lens type functional retroreflective sheeting as claimed in claim 1, 11 or 19 wherein the resin component contains, as principal constituent, at least one resin selected from the group consisting of acrylic resins, polyurethane resins, polyester resins, vinyl chloride resins and fluororesins.

21. A method of producing lens type functional retroreflective sheeting which comprises:
(a) providing a temporary support having been subjected to a treatment for preventing microspherical lenses from being temporarily embedded in some parts thereof, supporting a large number of microspherical lenses on those parts of said temporary support which allow microspherical lenses to be temporarily embedded, in such a way that the microspherical lenses are densely distributed so as to form substantially a mono-layer and the approximately hemispherical surfaces thereof are embedded in said temporary support, and thereby preparing a temporary microspherical lens-supporting sheet comprising said temporary support having the microspherical lenses embedded in some parts thereof;
(b) depositing a metal on the microspherical lens-bearing surface of said temporary microspherical lens-supporting sheet to form a deposited metal film on those approximately hemispherical surfaces of the microspherical lenses which project above said temporary support;
(c) separately preparing a support having a functional resin layer comprising resin component and functional pigment having light-storing or fluorescent properties, forming an assembly by superposing said support on said temporary microspherical lens-supporting sheet in such a way that the functional resin layer side of said support comes into contact with the microspherical lens surfaces projecting above said temporary microspherical lens-supporting sheet and having thereon the deposited metal film, and pressing and laminating the resulting assembly to embed the deposited metal film-bearing approximately hemispherical surfaces of the microspherical lenses in the functional resin layer of said support;
(d) stripping said temporary support from the resulting laminate to transfer the microspherical lenses to the functional resin layer of said support; and
(e) superposing a transparent protective film on the resulting base sheet having the microspherical lenses embedded in the functional resin layer, in such a way that the transparent protective film rests on those deposited metal film-free approximately hemispherical surfaces of the microspherical lenses which project above said base sheet, and using a relief mold disposed on the back side of said base sheet to partially thermoform the functional resin layer of said base sheet by the application of heat and pressure and thereby form bonds for bonding the transparent protective film partly to said base sheet.

22. A method of producing lens type functional retroreflective sheeting as claimed in claim 21 wherein said temporary support having been subjected to a treatment for preventing microspherical lenses from being temporarily embedded in some parts thereof is a temporary support having apertures formed by cutting out some parts thereof.

23. A method of producing lens type functional retroreflective sheeting as claimed in claim 22 wherein the total area of the apertures comprises 30 to 70% of the surface area of said temporary support before some parts thereof are cut out.

24. A method of producing lens type functional retroreflective sheeting as claimed in claim 21 wherein said temporary support having been subjected to a treatment for preventing microspherical lenses from being temporarily embedded in some parts thereof is a temporary support having a temporary microspherical lens-embedding resin layer formed in some parts thereof.

25. A method of producing lens type functional retroreflective sheeting as claimed in claim 24 wherein the total area of the parts on which the temporary microspherical lens-embedding resin layer is formed comprises 10 to 70% of the surface area of said temporary support.

26. A method of producing lens type functional retroreflective sheeting as claimed in claim 21 wherein the functional pigment is a light-storing pigment or an ultraviolet-excited fluorescent pigment.

27. A method of producing lens type functional retroreflective sheeting as claimed in claim 26 wherein the functional pigment is the light-storing pigment which is at least one oxide type light-storing pigment.

28. A method of producing lens type functional retroreflective sheeting as claimed in claim 26 wherein the functional pigment is the ultraviolet-excited fluorescent which is an inorganic fluorescent pigment containing at least one member selected from the group consisting of red light-emitting inorganic fluorescent pigments, green light-emitting inorganic fluorescent pigments and blue light-emitting inorganic fluorescent pigments.

29. A method of producing lens type functional retroreflective sheeting which comprises:
(a) supporting a large number of microspherical lenses on a temporary microspherical lens-embedding resin layer formed on some parts of a temporary support, in such a way that the microspherical lenses are densely distributed so as to form substantially a mono-layer and the approximately hemispherical surfaces thereof are embedded in the temporary microspherical lens-embedding resin layer, and thereby preparing a temporary microspherical lens-supporting sheet comprising said temporary support having the microspherical lenses embedded therein;

(b) depositing a metal on the microspherical lens-bearing surface of said temporary microspherical lens-supporting sheet to form a deposited metal film on those approximately hemispherical surfaces of the microspherical lenses which project above said temporary support;

(c) separately preparing a support having a functional resin layer comprising a resin component and functional pigment having light-storing or fluorescent properties, superposing said support on said temporary microspherical lens-supporting sheet in such a way that the functional resin layer side of said support comes into contact with the microspherical lens surfaces projecting above said temporary microspherical lens-supporting sheet and having the deposited metal film, and pressing the resulting assembly by means of a relief mold disposed on the back side of said temporary microspherical lens-supporting sheet or said support to embed the deposited metal film-bearing approximately hemispherical surfaces of the microspherical lenses in the functional resin layer of said support;

(d) stripping said temporary support from the resulting laminate to transfer the microspherical lenses present in the parts pressed by the relief mold to the functional resin layer of said support; and (e) superposing a transparent protective film on the resulting base sheet having the microspherical lenses embedded in the functional resin layer, in such a way that the transparent protective film rests on those deposited metal film-free approximately hemispherical surfaces of the microspherical lenses which project above said base sheet, and using a relief mold disposed on the back side of said base sheet to partially thermoform the functional resin layer of said base sheet by the application of heat and pressure and thereby form bonds for bonding the transparent protective film partly to said base sheet.

30. A method of producing lens type functional retroreflective sheeting as claimed in claim 29 wherein the relief mold used in step (c) is an embossing roll, mesh roll or gravure roll.

* * * * *